(12) United States Patent
Nussbaum

(10) Patent No.: US 12,437,050 B2
(45) Date of Patent: Oct. 7, 2025

(54) PEEiRS: PASSIVE EVALUATION OF ENDPOINT IDENTITY AND RISK AS A SURROGATE AUTHENTICATION FACTOR

(71) Applicant: Jared Nussbaum, New York, NY (US)

(72) Inventor: Jared Nussbaum, New York, NY (US)

( * ) Notice: Subject to any disclaimer, the term of this patent is extended or adjusted under 35 U.S.C. 154(b) by 123 days.

(21) Appl. No.: 16/987,559

(22) PCT Filed: Feb. 8, 2019

(86) PCT No.: PCT/US2019/017285
§ 371 (c)(1),
(2) Date: Aug. 7, 2020

(87) PCT Pub. No.: WO2019/157333
PCT Pub. Date: Aug. 15, 2019

(65) Prior Publication Data
US 2024/0419771 A1    Dec. 19, 2024

Related U.S. Application Data

(60) Provisional application No. 62/628,058, filed on Feb. 8, 2018, provisional application No. 62/714,148, filed on Aug. 3, 2018.

(51) Int. Cl.
| | | |
|---|---|---|
| G06F 21/00 | (2013.01) | |
| G06F 21/34 | (2013.01) | |
| G06F 21/41 | (2013.01) | |
| G06F 21/57 | (2013.01) | |
| G06F 21/10 | (2013.01) | |

(Continued)

(52) U.S. Cl.
CPC ............. *G06F 21/34* (2013.01); *G06F 21/41* (2013.01)

(58) Field of Classification Search
CPC ................................ G06F 21/34; G06F 21/41
See application file for complete search history.

(56) References Cited

U.S. PATENT DOCUMENTS

| | | | |
|---|---|---|---|
| 2014/0189808 A1* | 7/2014 | Mahaffey | G06F 21/6245 726/4 |
| 2019/0260734 A1* | 8/2019 | Bhargava | H04L 63/08 |
| 2023/0229750 A1* | 7/2023 | Weiner | G06F 21/35 726/17 |

FOREIGN PATENT DOCUMENTS

EP         3445015 A1 *  2/2019  ............. G06F 21/10

OTHER PUBLICATIONS

Mohammed Jubur, Prakash Shrestha, Nitesh Saxena; "An In-Depth Analysis of Password Managers and Two-Factor Authentication Tools"; ACM Computing Surveys, vol. 57, Issue 5, Article No. 128; Publication date: Jan. 2025; pp. 1-32 (Year: 2025).*

(Continued)

*Primary Examiner* — Fatoumata Traore
*Assistant Examiner* — Courtney D Fields
(74) *Attorney, Agent, or Firm* — Nolte Lackenbach Siegel; Myron Greenspan

(57) ABSTRACT

The password, a half century old concept that many depend on to preserve the confidentiality and integrity of data is badly broken, and accordingly places data and systems at great risk of loss or breach. This paper describes a passive and user independent means of applying concepts of identity, device trust, and risk based authentication to secure access to on-premise and cloud based resources; many of which rely solely on passwords. Additionally, this novel approach to authentication can further facilitate truly mobile computing, while maintaining, if not improving the overall user experience.

15 Claims, 16 Drawing Sheets

(51) Int. Cl.
    *G06F 21/35*     (2013.01)
    *H04L 29/06*     (2006.01)
    *H04L 29/08*     (2006.01)

(56) References Cited

OTHER PUBLICATIONS

R. Ward and B. Beyer. 2014. "Beyondcorp: A New Approach to Enterprise Security". ;login: 39 (6): 6-11. https://www.usenix.org/system/files/login/articles/login_dec14_02_ward.pdf.

L. Cittadini, B. Spear, B. Beyer, and M. Saltonstall. 2016. "Beyondcorp Part III: The Access Proxy". ;login: 41 (4): 28-33. https://www.beyondcorp.com/pdf/45728.pdf.

B. Osborn, J. McWilliams, B. Beyer, and M. Saltonstall. 2016. "BeyondCorp: Design to Deployment at Google". ;login; 41 28-34.

B. Beyer, C. Beske, J. Peck, and M. Saltonstall. 2017. "Migrating to BeyondCorp: Maintaining Productivity While Improving Security". ;login; 42(2).

V. Escobedo, B. Beyer, M. Saltonstall, F. Zyzniewski. "BeyondCorp 5: The User Experience". ;login; Fall 2017, vol. 42 (3).

C.Webber, "Passwords Are Dead. Long Live Multifactor Authentication.", Recode, last modified 2016, accessed Sep. 27, 2017, https://www.recode.net/2016/3/16/11586994/passwords-are-dead-long-live-multifactor-authentication.

Robert McMillan, "The World's First Computer Password? It Was Useless Too", WIRED, last modified 2012, accessed Sep. 27, 2017, https://www.wired.com/2012/01/computer-password/.

A. Shostak, "Origins of Time-Sync Passwords | Emergent Chaos", Emergentchaos.Com, last modified 2009, accessed Sep. 27, 2017, http://emergentchaos.com/archives/2009/07/origins-of-time-sync-passwords.html.

P. Bright, "RSA finally comes clean: SecurID is compromised". ARS Technica, Jun. 6, 2011. http://arstechnica.com/security/2011/06/rsa-finally-comes-clean-securid-is-compromised/.

A. Campi, "How Strong Is Strong User Authentication?", Isaca.Org, last modified 2012, accessed Sep. 29, 2017, https://www.isaca.org/Journal/archives/2012/Volume-5/Pages/How-Strong-is-Strong-User-Authentication.aspx.

History of FIDO Alliance. FIDO Alliance, Retrieved Jan. 27, 2018. https://fidoalliance.org/about/history/.

FIDO Alliance Specifications. FIDO Alliance, Retrieved Jan. 27, 2018. https://fidoalliance.org/download/.

* cited by examiner

Fig. 8

Examples of Endpoint Risk Evaluation Variables:

The following list is a sample of endpoint variables and other device data which is collected and evaluated as part of an endpoint status and risk report:

- Device serial and model number
- Hostname and/or GUID
- Windows build number and patch status
- Currently logged on user and permissions
- Domain membership information
- Group policy status
- List of all running processes and services
- Hash of any unsigned running process
- Current anti-virus version, date of update
- Disk encryption status

- Windows security center status
- Windows firewall status
- Device MAC and IP addresses
- Current external IP addresses
- List of all detected SSIDs (Derive location)
- Any pre-defined custom registry keys
- Fingerprint of any relevant certificates
- TPM related data
- Current network connections
- Data required to generate device fingerprint (Part A)

PEEiRS Applied to SAML/SSO Authentication

Continued in Fig. 9 – Part B

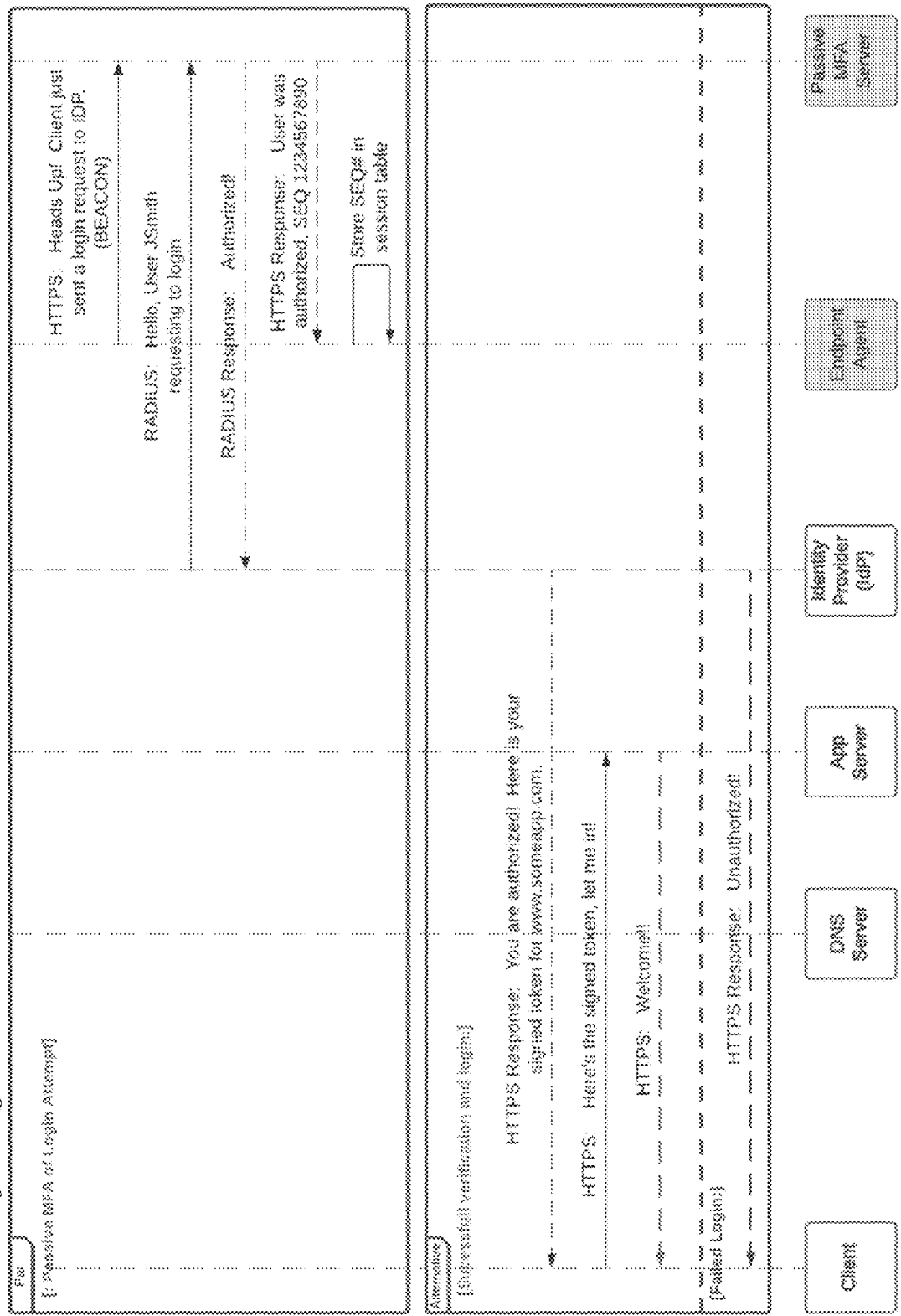
Fig. 9 (Part B)

(Part A)

PEEiRS Applied to WS/FED Authentication (Proxy-Auth)

Continued in Fig.10 – Part B (Part B)

(Part A)

PEEiRS applied to SAML-based SSO Authentication with Attack Detection

Continued in Fig.11 – Part B (Part B)

(Part C)

PEEiRS: PASSIVE EVALUATION OF ENDPOINT IDENTITY AND RISK AS A SURROGATE AUTHENTICATION FACTOR

BACKGROUND OF THE INVENTION

Field of the Invention

The invention generally to authentication of users and, more specifically, to perform such authentication with multiple factors that are derived via Passive Evaluation of Endpoint Identity and Risk as a Surrogate Authentication Factor.

Description of the Prior Art

Security and functionality are often thought of as near polar opposite objectives. While the risk of breach can be significantly reduced through the implementation of various security related policy and technical controls, comprehensive risk reductions typically require some negative impact on baseline functionality, accessibility, privacy, and even performance, collectively referred to as "user experience". Further complicating this persistent puzzle of cybersecurity is the proliferation and adoption of "cloud" Software as a Service (SaaS) and Infrastructure as a Service (IaaS) offerings, which while facilitating mobile and access-anywhere computing, have all but invalidated traditional perimeter protection and enforcement models previously utilized as cornerstones of cybersecurity strategy and architecture.

In many ways, identity is the new perimeter. With many enterprises moving data and other computing assets to cloud platforms far outside physical purview, firms are now faced with difficult decisions regarding overall security and access control that weigh user experience against risk. One obvious means of securing these borderless assets is through identity based modalities of high confidence, such as multi-factor authentication and certificate based authentication. However, repetitive user prompting and lack of prolific support across multiple platforms and applications threatens to negatively impact user experience, or even expose computing assets to risks from unmanaged devices.

Interestingly, innovative companies, such as Google with their "BeyondCorp" framework for enterprise security[i,ii,iii,iv,v], have embraced the concept of per-application, risk based access control models for zero-trust environments with identity based authentication, and have published a series of papers detailing how user and device trust concepts are now being used to authorize access to otherwise publically accessible resources. However, while the BeyondCorp approach aligns well with Google-esque "apps", web-based resources, and other platforms that support one of a few standards-based federated authentication protocols, the concept does not translate well to non-browser based or legacy applications.

It has been said "passwords are dead"[vi], and while we certainly applaud the substantial and significant work performed by those at Google, there remains a large scale need to extend identity and per application, risk-centric authorization concepts beyond the browser. This paper details a novel means of applying concepts of identity, device trust, and risk based authorization uniformly to all enterprise applications. As many enterprises struggle with securing both on-premise and cloud based resources while facilitating truly mobile computing, this new modality should provide a significant improvement in security of enterprise assets, while maintaining, if not improving the overall user experience.

I. Defining the Problem

Many would be surprised to know, the most common means of securing modern day systems was actually developed in the 1960's by Fernando Corbato at MIT. According to numerous sources, he created password-based access controls as a means of limiting access to the Compatible Time-Sharing System (CTSS), as it was one of the first instances where there were multiple terminals, each to be operated by multiple users that would have their own files. While some would argue that other access-control modalities existed at the time, such as knowledge-based authentication (e.g. use of mother's maiden name), Corbato recalls that "Putting a password on for each individual user as a lock seemed like a very straightforward solution." [vii]Straightforward, yes; secure, not exactly.

Not long after the implementation of password controls on the CTSS, the world experienced its very first password hacking by another MIT researcher. In 1962 Allan Scherr was looking to increase his computing time allocation beyond the provided four hours per week, so he cleverly and simply asked the CTSS to print out the password file containing each user's credentials. Considering that "breach" wouldn't be discovered until nearly 25 years later, one must wonder why we still have the same fundamental problem: Utilizing one factor to authenticate a user, especially when said factor needs to be complex, unique per resource, and remembered, simply does not work; especially when it is also easily stolen.

a. A Step in the Right Direction: Single Sign-on and One Time Passwords

From an enterprise perspective the multi-password problem has been tackled through an approach generally referred to as "single-sign-on" or SSO. Simply put, users authenticate to one central authority called the Identity Provider (IdP), which in turn provides an assertion of the user's identity to whichever resource they are connecting. Through the use of standards based authentication protocols such as SAML, OAUTH, or WS-FED (further described in section IV.a.i), one authority can cover many resources, but still, one set of static credentials weakens the overall security of the nearly 60 year old approach known as demonstrating knowledge, or more commonly referred to as "something you know".

The first means of solving the static-password conundrum was developed by one-time psychology professor Ken Weiss in the early 1980s, however the approach was not designed with computer security applications in mind; but rather as a means of keeping security guards honest about their patrol check-in times[viii]. Guards were greeted at each check-in point by a device that generated seemingly random numbers that were derived from time, which they would either record or call in at each check-in point to prove when and where they were. It would not be until 1983 that this concept would be developed into the first One-Time-Password (OTP) generator, created as a means of providing strong authentication for access to various secured rooms of the Pentagon.

OTP generators provide a dynamic, pseudo-random multi-digit code which is generated through the combination of a seed value and hashing algorithm. The pocket sized or virtual devices, similar to those shown in FIGS. 1, 1A and 1B, are generally time or event based, and synchronized with a server that also knows the (secret) seed value and algorithm. By combining the traditional password or PIN concept ("something you know"), with the OTP derived concept of "something you have", Weiss gave us the first two-factor authentication system. Unlike the short duration required to steal the first static password, it would be many years before OTPs would suffer a similar fate[ix].

Since the turn of the century, adoption of OTP-driven two factor authentication systems has steadily increased, but has yet to overcome single-factor implementations. This is largely due to a variety of factors including general usability, a series of unfortunate attacks on the underlying mechanics, and the potential for relatively simple man-in-the-middle attacks. Additionally, while traditional OTP platforms provide greater assurance of the user's identity, much is still unknown about the endpoint from which access is being attempted. In order for a strong authentication system to be widely adopted it must satisfy several requirements:
1. It must identify the user
2. It must provide a high confidence assurance of the user's identity
3. It must provide a high confidence assurance that the user's endpoint and operating environment are secure
4. It must be easy to use Fortunately, present-day Identity and Access Management (or IAM) technology offerings can easily satisfy at least the first two requirements, with an increasingly limited set of solutions capable of handling the third or even fourth requirement. That said, all four requirements could potentially be satisfied by combining a series of factors including "something you know", "something you have", and "something you are"; provided they are evaluated with very minimal user interaction or awareness, and reevaluated on a near continuous basis. This paper will describe our approach for minimizing access associated risk, while satisfying the above requirements through passive side-channel evaluation of the endpoint and other associated devices.

II. Current State of The Art

There have been significant advances in two and multi-factor authentication technologies since the time of Weiss' first OTP generator in the early 1980's. Usability has greatly improved through the introduction of smaller or virtual (e.g., soft token or phone based) OTP generators and so-called "push" verification methods; and risk of other authentication attacks greatly reduced through use of biometrics, cryptographic certificates and smart cards, and optical screen reader capable OTP tokens. Additionally, a renewed focus on endpoint identity and associated security posture has catalyzed an approach sometimes referred to as "device trust", however challenges in implementation and integration of trusted endpoint approaches, especially in legacy or non-HTTP based applications[xi,xii] has detracted from its applicability or usefulness in some environments. Nonetheless, all the above have greatly strengthened our ability to authenticate and authorize users of information systems, and are further discussed below.

a. Advances in OTP and Other Second Factor Technologies

As noted previously, adoption of traditional OTP-based two and multi-factor authentication systems has faced significant resistance, largely due to negative impacts on user productivity or usability. Less recent advances in the space such as reduction in size of the physical OTP generator, phone call-backs for verification, software-based OTP clients, or the now controversial transmission of an OTP to cellular device by Short Message Service or SMS protocol[xiii], all greatly improved user satisfaction but still required users to enter a multi-digit code following initial authentication.

More recently, ratification of a standard Time-based One-Time Password algorithm (TOTP) in 2011[xiv] fueled the increased proliferation of inexpensive two-factor authentication enabled platforms, as well as smartphone clients. However, that same year IAM vendor Duo publically introduced the "Duo Push", which could be considered the biggest innovation to two-factor authentication since inception. The term "push" refers to the process by which a 2FA verification message similar to that depicted in FIG. 2, is sent (or "pushed") to a user's registered smartphone, which they simply accept or "approve" with a tap on the screen. The user experience was further enhanced by Duo's (and others) ability to reduce the number of re-verifications in certain instances, by "remembering" the now validated accessing endpoint.

In addition to greatly increased user satisfaction, Duo's now somewhat commonplace (and multi-vendor provided) method also decreases the risk of certain types of authentication attacks, but until very recently still focused on verification of the user identity while informed endpoint related verification was largely absent.

Indeed, further innovation is on the horizon for OTP-like authentication models, with more standards based authentication schemes being introduced on a seemingly regular basis. One such set of emerging authentication protocols is currently under active development by the Fast IDentity Online (or FIDO) Alliance, an industry association founded in 2013[xv] that now numbers over 250 member organizations, with more than 300 FIDO certified authentication solutions now available to end-users. Those open-standard protocols now include the Universal Authentication Framework (or UAF) and Universal Second Factor (or U2F), which provide specifications for password-less logins and an enhanced two-factor mechanism, respectively[xvi]. U2F, which was introduced in 2014 and recently revised to version 1.2 this past July, specifies a second factor mechanism that incorporates widely accepted public key cryptography to generate a user and site specific key-pair for each login. Such keys can be stored on any U2F compliant device, such as the USB connected FIDO U2F Security Key by Yubico, which is shown below in FIG. 3. The newer U2F revisions also provide for various wireless-enabled means of key transport, such as NFC and Bluetooth.

b. VPN: The Three Letters of (Impending) Extinction

Prior to the introduction of viable cloud-computing platforms, highly mobile user endpoints, or bandwidth intensive web-services (e.g., Netflix), many enterprises facilitated remote access to corporate computing resources through a small number of centralized gateways, one of which was the Virtual Private Network (or VPN) concentrator. This largely cost effective access modality effectively put the user's remote endpoint (e.g., laptop) on the "trusted" corporate network, which connected over the public Internet via a secure and encrypted "tunnel", regardless of the endpoint's actual location. It also provided the ability to apply Internet filtering and other controls to a user's web use, by forcing or backhauling all remote user Internet access through the corporate datacenter. Finally, VPN platforms provided the added benefit of being able to query not only the user, but also to some extent, the endpoint as well.

For all their benefits, VPNs were, and still are largely deployed and utilized. However, as enterprise computing resources become more distributed and cloud based, capabilities of highly mobile devices grow, and bandwidth requirements for some Internet applications skyrocket, the centralized hub-and-spoke architecture of VPNs has become less favorable due to the negative effects on performance inherent in its design. Accordingly, when evaluating new enterprise remote access modalities, the once gold standard three-letter-acronym for remote access, now generally falls short of the evolving requirements of many organizations and enterprises.

c. BeyondCorp: Google's Approach to Authentication in a Perimeter-Less World

Beginning in 2014, Google started to publish a series of thought provoking papers which describe an innovative risk-based access control model built around the concept of "Zero Trust", and represents a significant shift or evolution in thinking about traditional identity and access management. The approach, which Google has termed "BeyondCorp" effectively abolishes traditional security boundaries or perimeters, and instead treats users and resources as if they all exist on the untrusted Internet[1][2][3][4][5]. In practice, the identity and risk profile of both user and endpoint, irrespective of location or any other implied trust model, is utilized to determine the level of authorization to be granted on a per-application basis. Not surprisingly, the BeyondCorp model requires a high-confidence verification of user identity, and more importantly, a snapshot of the endpoint's current security posture, in order to create the necessary risk profile which is then used to dynamically assign the endpoint to a series of defined trust-tiers. Similarly, any change to the endpoint's risk profile can result in reassignment to a different tier.

As noted previously, while the BeyondCorp approach aligns well with Google-esque "apps" and other HTTP or web-based resources, there are a few architectural challenges that must be overcome in order to apply the model to non-HTTP based platforms or other legacy applications, where typically a browser extension is able to perform or facilitate many of the BeyondCorp required client-side evaluations or other functions. Such challenges include application integration with the common or centralized enforcement points (e.g., BeyondCorp Access Proxy), as well as establishing high-confidence identity of user and endpoint, without impacting user experience.

Perhaps the greatest of these challenges is the need for common enforcement points or what the BeyondCorp model refers to as "Access Proxies", which as the proverbial sentry for any given application or datastore, and as depicted in FIG. 4, must be positioned in front of the desired resource. Similar to VPN-based access, this design hurdle becomes more complicated for organizations that operate across a large geographic area or even global basis; and may further compound if more than one cloud provider is utilized to deliver services. Granted, as Google, you can engineer these points in as many places as needed; but without that level of scale or resources this becomes a far greater challenge. In some regards the common enforcement point concept is very similar to use of proxies or centralized VPN gateways noted in the previous section, however in the former case you only backhaul specific application traffic as opposed to all traffic-which as discussed, has both positive and negative implications.

d. Trusted Device Models: Getting Closer, Still Missing the Mark

Most recently, and right on the heels of BeyondCorp, several IAM vendors including Duo, Okta, and even Microsoft have announced various approaches toward some aspect of integrating traditional single or multi-factor user authentication, with endpoint identity verification in access control operations. At a high-level, these single-sign-on mediated approaches enable access decisions based on organizational device management or trust status, some examples of which are highlighted below:

Duo Security—Trusted Access
  Trusted Endpoints[xvii]: A feature set that mediates access by recognizing a corporate managed device, generally through presence of a certificate or matching an existing registration in the organizations device management system.
  Endpoint Remediation[xviii]: An agentless solution that identifies certain vulnerable software components on endpoint devices (e.g., browser plug-ins), and can block authentication requests from those affected. A "Self-Remediation" option facilitates user-initiated patching of identified software components.
Microsoft—Conditional Access for InTune and Azure AD[xix,xx]: Allows for the incorporation of managed device enrollment and compliance status information when evaluating authentication requests for access to Office365 applications, or those for which Azure AD is acting as an Identity Provider (IdP). As In Tune is largely a device management platform, the Microsoft offering does allow for a more in-depth evaluation of endpoint risk than other offerings.
Okta—Device Trust[xxi]: Similar to Duo's "Trusted Endpoints" offering, Device Trust can identify corporate managed devices through presence of a cryptographic certificate on the user's endpoint, and utilize such information when evaluating authentication requests as an Identity Provider (IdP).

Aside from the obvious benefits to application security, the ability to evaluate or identity the endpoint as known or trusted can also be used as an additional and passive authentication factor. However, as with other approaches, including BeyondCorp, such models typically require the application to be browser-based, support so-called "modern authentication" which enables clients to handle advanced authentication modalities such as certificates, tokens, and federated identity providers (e.g., through libraries such as Microsoft's ADAL[xxii]), or in some cases may require significant investment or commitment toward a given provider's full offering to achieve a satisfactory user experience (e.g., achieving reduced multi-factor challenges in Microsoft Outlook for Office 365, when federating through WS-FED and not employing a full ADFS deployment). As noted with other approaches, these limitations restrict the applicability of current trusted device authentication models, especially with non-browser based or legacy applications.

The current state of Identity and Access Management technologies is a vast improvement over that which existed even five years ago, with significant gains in both security and usability. However, much of those improvements are a result of innovations tied heavily to certain application types or architectures, such as web (or browser) based apps and centralized cloud-based application servers; or limited for use with specific device management platforms. Accordingly, there remains a large scale need to extend concepts of zero-trust, enriched identity, and per application, risk-centric authorization beyond the confines of the browser.

SUMMARY OF THE INVENTION

Given the above, our goal was to create a largely application and identity provider agnostic means of significantly enriching authentication beyond single factor credentials, with minimal to zero user perceived impact or otherwise required user interaction. The approach in accordance to the invention, the Passive Evaluation of Endpoint Identity and Risk as Surrogate (or PEEiRS), is a novel means of applying concepts of identity, device trust, and risk based authorization uniformly to many enterprise applications, as a passive and out-of-band surrogate for traditional user-impacting two factor (2FA) or multi-factor (MFA) authentication schemes. Additionally, PEEiRS is designed for applicability to many web and non-web (or non-HTTP) based applications, largely irrespective of resource location or architecture. By leveraging the user-independent evaluation of multiple device and risk specific factors at time of login, the user has almost no perception that a multi-factor authentication is taking place at time of a seemingly traditional single factor login; which we believe improves both the security of systems as well as the overall user experience. A high-level overview of PEEiRS leveraged in authentication of a single-sign-on (SSO) enabled web application is described below and depicted in FIG. 5, with an in-depth discussion of the approach in sections that follow.

BRIEF DESCRIPTION OF THE FIGURES

The above and other aspects, features and advantages of the present invention will be more apparent from the following description when taken in conjunction with the accompanying drawings, in which:

FIG. 8 are examples of Endpoint Risk Evaluation Variables;

DETAILED DESCRIPTION a. Overview of a PEEiRS Enriched Authentication Request

Figure 1:
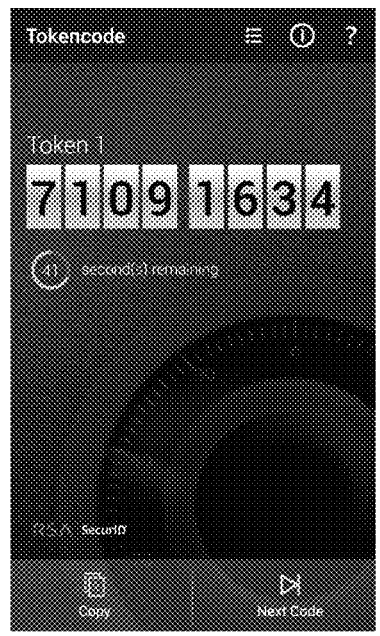
FIGS. 1, 1A and 1B depict various generations of traditional OTP generators.
Figure 1A:
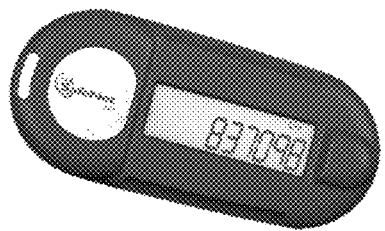
Figure 1B:
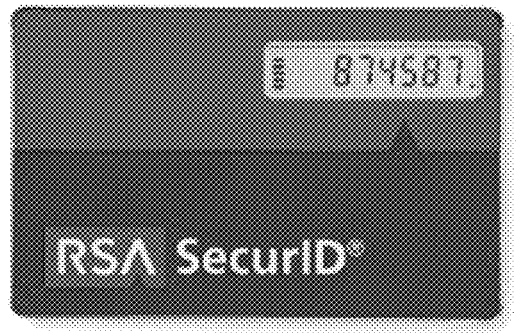
Figure 2:
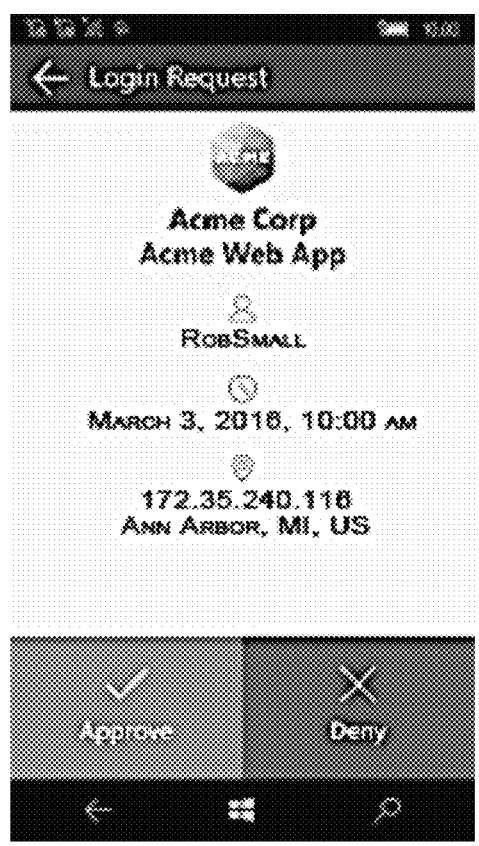
FIG. 2 is an example of a Duo Push Smartphone Verification Message.
Figure 3:
FIG. 3 illustrates the Yubico FIDO U2F Security Key.
Figure 4:
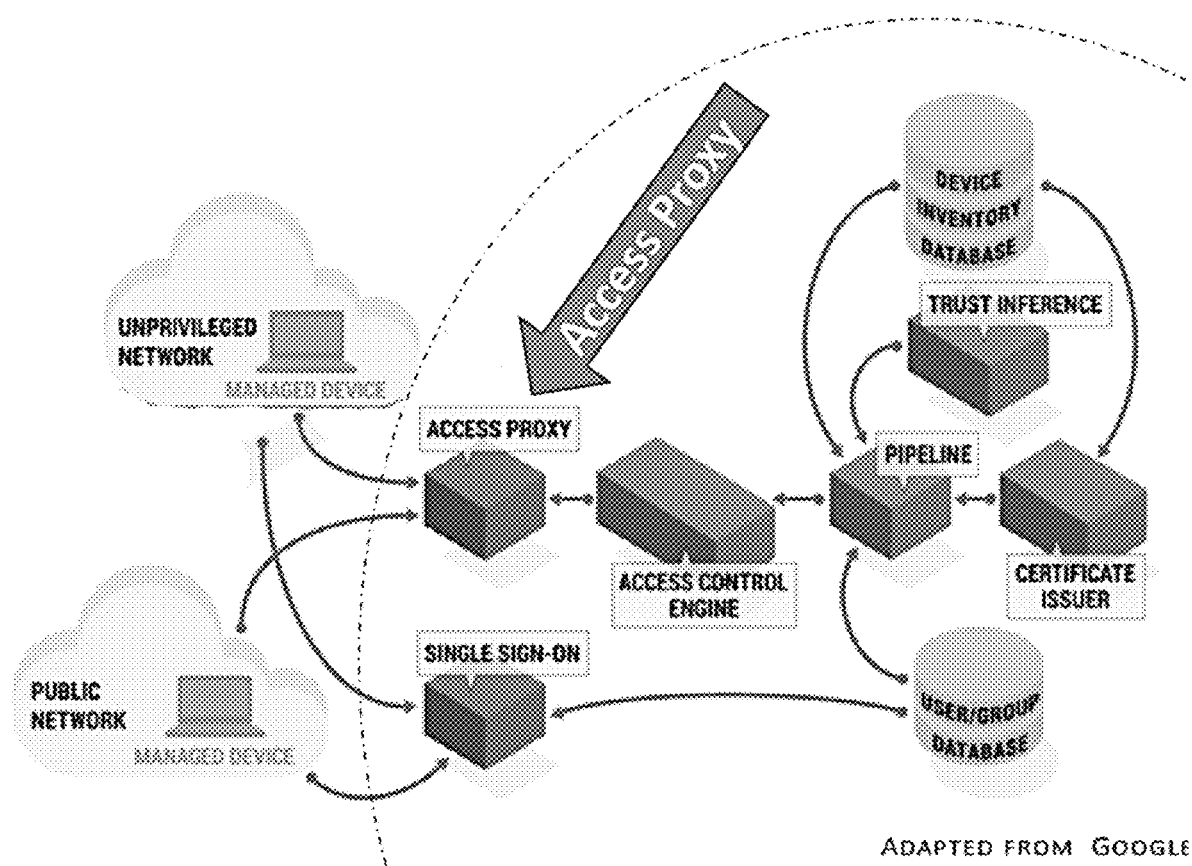
FIG. 4 is an adapted diagram of the BeyondCorp Architecture.
Figure 5:
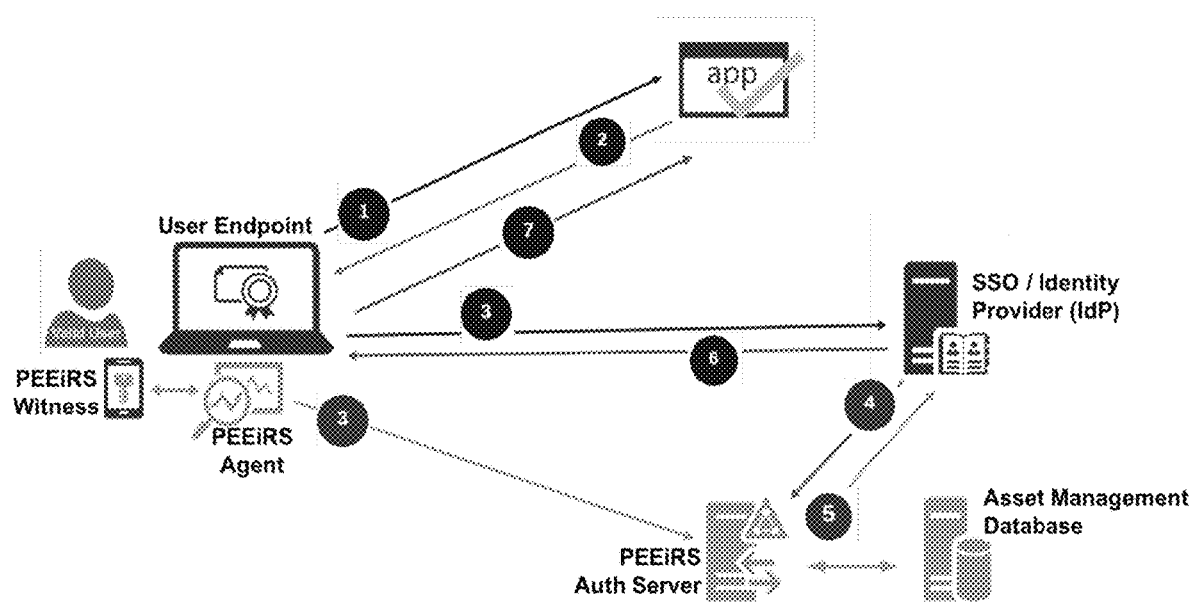
FIG. 5 is a high-level overview of PEEiRS applied to a SAML authentication sequence.

As depicted in FIG. 5, and in effort to provide a high-level overview of PEEiRS applied to a SAML-enabled SSO authentication sequence, below we outline the key concepts and steps involved in such implementation of our approach, which assumes an initial endpoint-to-PEEiRS authentication has already occurred. The approach varies somewhat with federated authentication by proxy (e.g., WS-FED), as well as non-federated authentication enabled or proprietary applications, which are discussed in later sections.

i. Key Concepts:

User Endpoint: A fixed or mobile computing device, from which a user intends to access a protected corporate or organization information resource. Such device can be located within a physical organization managed building, or elsewhere in the world, connected via public Internet.

Application or Service Provider (SP): A corporate or organizationally owned/managed application or other information resource, which the user intends to access. In this example, it is assumed the application natively supports federated authentication functionality. In such a model, application traffic takes place between application server and endpoint, without the use of an access proxy.

Identity Provider (IdP): In this example, the IdP is an on-premise or third-party (cloud based) identity provider which mediates access to a variety of federated authentication-enabled (single-sign-on) applications on behalf of an organization.

IdPs typically support a number of standards based authentication protocols such as SAML, OAUTH[xxiii], OpenID[xxiv], and WS-FED[xxv] to facilitate the federated user to application authentication function.

Security Assertion Markup Language (SAML)[xxvi]: An open standard protocol established in 2002, that provides for a means of exchanging authentication, authorization, and other security related attributes (metadata) or information between an Identity Provider (IdP) and application or Service Provider (SP), and is largely utilized for authentication in SSO enabled applications (as demonstrated in FIG. 5).

Such exchanges are often referred to as "assertions", in which the IdP provides an application with information on a given user's permission to access resources; however, it is important to note little to no information on the endpoint utilized is provided.

SAML exchanges or assertions are often communicated through cryptographically signed tokens relayed by the requesting application or user.

In the context of "trusted device" models, at time of authentication the IdP may evaluate an endpoint's status (e.g., by querying the requesting browser for a recognized cryptographic certificate), based upon which it may send a SAML assertion noting denial of access if certain criteria are unmet.

PEEiRS Endpoint Agent: A lightweight software application which runs in the background, and performs several functions including (1) Establishing a "Witness" validated user-device trust relationship with the PEEiRS Authentication Server; (2) Performing periodic risk evaluations of the endpoint, and sending reports to the Authentication and Proxy Server; and (3) Monitoring endpoint activity for authentication attempts (e.g., SAML requests), and notifying the Authentication and Proxy Server at time of detection.

PEEiRS Off-Device (Mobile) Identity Witness: This component facilitates certain endpoint registration and cryptographic functions, and also serves as an endpoint-to-user proximity watchdog. Importantly, any new PEEiRS endpoint-to-server session must be signed by the Witness, whose secret or private key (SK) never leaves the device.

PEEiRS Authentication and Proxy Server: A server or service which performs a series of functions including (1) Registering and tracking authorized endpoints, their associated hardware and software characteristics, public keys, and current risk profile as reported by the endpoint agent; (2) Integrating with IdPs and other authentication platforms to provide a pseudo-2FA authentication ruling via standards-based protocols (e.g., Remote Authentication Dial In User Service or RADIUS, often used in the centralized authentication of users by various remote access devices and applications[xxvii]); and (3) When needed for integration with proprietary or non-standards based applications, can function as an intermediary gateway or forward/reverse-proxy, positioned either in front of protected applications or (preferably) between applications and authentication platforms.

ii. A PEEiRS Enabled Application Authentication Sequence: (The following sequence is illustrated in FIG. 5)

Step 1: Mobile user (endpoint) attempts to login to a SAML-enabled web application from any given point on the Internet.

Step 2: Application provides user a SAML token to get signed by pre-established IdP, and redirects endpoint web-browser to the IdP.

Step 3: Simultaneous operations by the endpoint client as well as PEEiRS agent, and the only time user may be prompted for single-factor credentials:

3 Blue: Endpoint connects to IdP, provides single-factor user credentials and (application provided) SAML token for signing.

3 Red: Simultaneously, the PEEiRS agent detects the sign-on attempt and notifies the Authentication and Proxy Server of the impending authentication request from the IdP, including the latest endpoint risk evaluation report. Note, said detection can be based upon DNS query/response, HTTP(S) handshake and associated certificates, or parsing of another application or lower level protocol. While possible, the above does not assume access to the plaintext of the authentication traffic. In this example for a standard web app (and as depicted in section VI, example C):

1. PEEiRS first detects and validates the DNS query for the application (SP) or IdP based upon known good responses.
2. It then monitors for the subsequent HTTPS handshake, followed by extraction and validation of the presented certificate.
3. Finally, it monitors for certain traffic patterns or protocol anomalies that could indicate an incomplete or failed authentication session.

Step 4: IdP performs a primary authentication verification on the single-factor credentials provided by the user/endpoint, and if successful makes a 2FA query via RADIUS to the PEEiRS Authentication Server.

Step 5: PEEiRS Authentication Server evaluates the request from IdP along with the associated PEEiRS agent notification and risk report, and either accepts or denies the IdP's 2FA/RADIUS inquiry.

Step 6: If accepted, IdP signs (provides an assertion for) the SAML token and returns it to the endpoint.

Step 7: Endpoint sends the signed SAML token back to the application server, which is accepted and user is granted access to the application.

b. Challenges of the Approach

In developing PEEiRS, we have thus far both forecasted and encountered a number of challenges in developing and applying our approach. Some of those challenges anticipated or encountered are discussed below.

i. Remaining Identity Provider (IdP) Agnostic and Associated Integration Issues

Integration: As some IdPs already have proprietary trusted device offerings, we strongly wanted to ensure our approach could be applied to as many application authentication sequences as possible, irrespective of the gating IdP or other authentication platform utilized. Ultimately, as many major IdPs and even legacy on-premise remote access gateways support a generic 2FA integration via standards-based protocols such as RADIUS, we designed PEEiRS to initially integrate via a RADIUS call. However, this universal approach does limit PEEiRS ability to assert varying levels of authorization based upon endpoint risk. Of course, such integration can also occur via any number of protocols or APIs, which will be further evaluated in the short term.

Avoiding Race Conditions: The window between when an authentication attempt is detected by PEEiRS, and the IdP makes a RADIUS call (via UDP) to the PEEiRS Authentication Server is limited, and can result in an authentication timeout if the RADIUS (or other backend authentication protocol) response is too slow. For this reason we made three specific design decisions: (1) Perform periodic comprehensive endpoint evaluation-report cycles irrespective of authentication events, with the time-of-login report including a shorter evaluation routine and smaller payload; (2) Implement a fast and lightweight traffic monitoring mechanism to detect authentication attempts, designed to activate higher cost routines only when required; and (3) Require a backend IdP integration protocol that supports the receipt of connection-identifying metadata from the IdP, which helps to associate the login attempt with a PEEiRS protected endpoint. Additional timing-related attacks and mitigations are further discussed below in "Threats". While the agent-to-authentication server communication currently occurs over standard HTTPS/TLS (and thus TCP), future work will evaluate utilizing UDP for notification events.

ii. Remaining Application Agnostic and Proxy Free

Non-browser HTTP(S) based (thick) applications: At the onset of this project, a key motivation was to enable 2FA functionality for applications that were not browser based, but still communicated over HTTP(S). In some instances, these applications utilize browser-like authentication dubbed "modern authentication", which while not necessarily providing a satisfactory user experience (e.g., periodic or seemingly repetitive 2FA re-verifications in certain implementations), may nonetheless integrate with present day active 2FA authentication systems. That said, as our goal was to provide enhanced security and an improved user experience, we accounted for such implementations in the standard passive traffic monitoring and out-of-band notification operation of the PEEiRS client-side agent, provided certain integration requirements are supported on the application server:

Primary Integration Method: Systems or servers which support federated or secondary authentication schemes via standard protocols (e.g., LDAP, RADIUS, PAP/CHAP, Kerberos, etc.).

Secondary Integration Method: Non-federated or secondary authentication enabled platforms can be accommodated through use of either an authentication proxy situated between server and authentication platform, or somewhat less preferably a front-end reverse proxy situated in front of application server. In the case of the latter, this model may require PEEiRS servers to stay in the active application traffic path, which is a mode preferably avoided in effort to not impact application performance.

Non-HTTP(S) based or other legacy applications: Applications which are not HTTP(S) based or use proprietary protocols present one of the more difficult challenges toward our approach. Not surprisingly, the Google team notes as much in at least one of the BeyondCorp papers[xxviii], and takes a few different approaches to accommodate what they term as "Naive HTTP cmd-line applications" and other non-HTTP applications, including implementation of a client-side (HTTP) proxy, use of an SSH tunnel with port forwarding, or another VPN-like encrypted service tunnel[2]. In contrast, one key differentiator gained through use of passive monitoring with an out-of-band signaling approach, is the lack of reliance on a browser or browser-like intermediary to facilitate the higher-level authentication and endpoint evaluation operations. As such, provided we can parse relevant portions of the protocol in use (and the previously noted integration requirements are satisfied), there is a high likelihood we would be able implement PEEiRS for the application in question. Finally, as noted previously in "PEEiRS enabled authentication sequence—Step 3", while possible we try to avoid the decryption of traffic due to associated overhead, as well as overall complexity in re-encrypting traffic without breaking endpoint or application certificate validation.

iii. Minimizing User Perceived Impact

User experience cannot degrade, only improve: A key guiding, and admittedly difficult to apply principle of this project was to maintain or improve user experience, while also improving security. For us, this meant if a user is accustomed to providing the occasional single-factor credential for authentication, then outside of a very rare or one-time occasion, the user should never be prompted to provide a second-factor. This required us to engineer a means of identifying both users and their corresponding endpoints with high-confidence, but without asking the user for any further information. To accomplish this, we took the following approach:

Endpoint Identity: At time of registration, a given endpoint's hardware characteristics are matched to a previously captured inventory, and with appropriate credentials and an OTP, is enrolled with a public/private key-pair.

Off-Device (Mobile) Identity Witness: Users will be prompted to load a companion app on a secondary and ideally mobile device (e.g., a smartphone), which we refer to as the witness. This component provides several (mostly passive) functions including (1) Holds an off-endpoint signing key used to validate certain endpoint-server transactions; (2) Functions as a user-endpoint proximity watchdog, capable of invalidating future application authentication attempts if the distance between witness and endpoint exceeds a time-dependent configurable limit, or if the Witness device remains in a locked state for longer than a predetermined period; (3) Aids in the final registration task of tying user and witness to endpoint, through either a pairing code or scan-able QR code on endpoint.

User Identity: At same time of registration, user is validated on endpoint through the aforementioned Witness pairing, or conversely with a one-time 2FA challenge sent to a previously associated device. From this point forward, provided the user is logged on to the endpoint (with single factor credentials), the associated Witness device is within close proximity for defined time windows, and the endpoint's risk profile remains constant-a zero user-challenge, passive multifactor authentication should be possible.

Other surrogates: In future development we will be evaluating the incorporation of user behavior, key stroke dynamics, geolocation tracking, and other anomalous operating variable monitoring to further increase confidence of user-endpoint identification.

iv. Threats

This section covers threats focused on the client side of PEEiRS, and other associated attacks and abuses that could be utilized to intercept or obtain credentials, or otherwise spoof a legitimate user and endpoint in order to gain unauthorized access to a PEEiRS protected system.

Use of Stolen Credentials

Overview: Despite the numerous highly publicized breaches involving theft of user credentials and the wide-availability of multi-factor authentication solutions, Verizon's annual Data Breach Investigations Report (DBIR) has once again confirmed use of stolen passwords as the top tactic utilized by malicious actors for breaching systems[xxix].

Understandably, with PEEiRS we are attempting to limit the value and usability of stolen, intercepted, guessed, or otherwise compromised credentials through a passive multi-factor authentication, but such mechanism fails if an attacker is able to spoof a legitimate user during the first-time PEEiRS user registration, or at some future time during normal operation.

Tools and Tactics: Credentials are often obtained through various attacks that leverage phishing and other forms of social engineering, malware (e.g., key loggers, or password dumpers), and even credential reuse from a previous breach. Such attacks are often delivered through malicious emails or compromised websites.

Detection Mechanism: PEEiRS is designed to prevent use of stolen credentials, rather than detect their theft with attacks noted above. That said, some detection capabilities do exist to prevent the interception of credentials on a PEEiRS protected endpoint, which are noted in the next threat type below.

Mitigation(s):

(1) At time of user onboarding, and in addition to standard credentials, the user must (a) Be registering from a known device (e.g., exists in organizations inventory management, member of domain, has certain other known characteristics); and (b) Approve the registration attempt via a previously designated 2FA/MFA modality; or scan a one-time registration image with a pre-designated witness device. The latter is also required to validate the user-endpoint identity pair.

(2) In normal use of PEEiRS for passive multifactor authentication, a recently unlocked witness device must be present to sign certain communications between the PEEiRS endpoint agent and server; which effectively demonstrates the registered user is present.

Interception or Malicious Acquisition of Credentials:

Overview: As one of the operating assumptions of PEEiRS includes use of non-trusted networks without VPN, the potential risk for malicious interception of data, credentials, or other authorized session identifying tokens (e.g., signed SAML tokens, as noted in step 7 of section IV-a-ii) is certainly elevated. Once intercepted, an attacker can potentially re-use or replay the captured data to spoof the user and gain access to otherwise protected systems and information, thus effectively bypassing the requirement for authentication by other factors.

Figure 6:
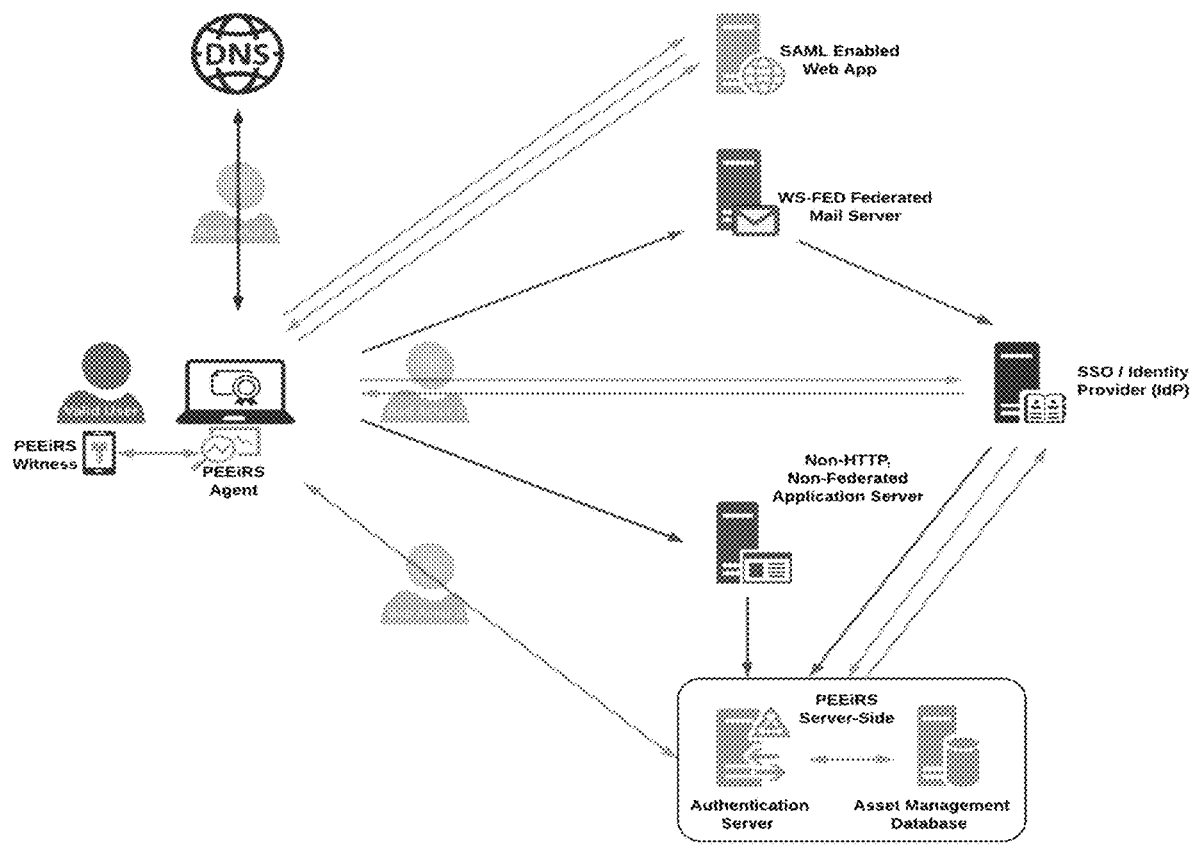
FIG. 6 is a high-level PEEiRS architecture diagram, with various types of authentication flows and potential positioning of bad actors.
Figure 7:
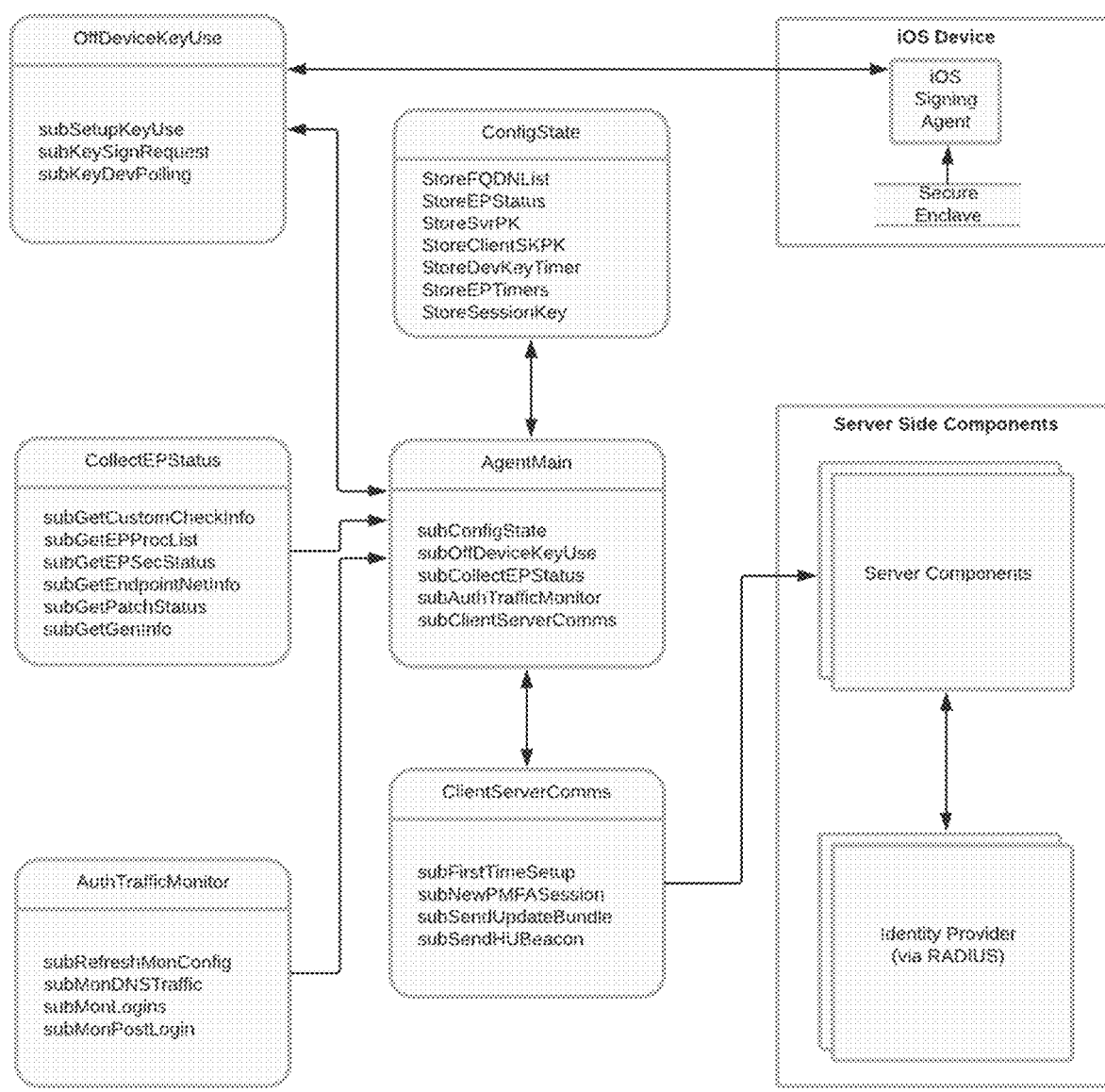
FIG. 7. is a PEEiRS Endpoint Agent Component Diagram.

Tools and Tactics: Various types of interception, Man-in-the-Middle (MiTM), and code injection attacks, including ARP and DNS spoofing or poisoning, rogue or compromised wireless networks, and cross-site scripting or cross-site request forgery attacks, some of which are depicted in FIG. 6. In an effort to mitigate the risk of a successful attack resulting in captured credentials, session tokens, or other data, we are employing the following mitigation techniques:

Detection: In order to identify potential malicious activities or attacks, PEEiRS monitors IP communications on the endpoint which are associated with known or "protected" applications, as well as key system services (e.g., DNS). Such mechanisms are further described in mitigations below.

Mitigation(s):

PEEiRS Certificate Pinning: By default, all endpoints store a pre-distributed copy of the primary and secondary PEEiRS Authentication Server public keys. Any and all communications between endpoint and PEEiRS Authentication server are validated and encrypted with this key. Any attempt to impersonate the server results in a failed TLS handshake. Conversely, at time of registration the Authentication Server stores a copy of the endpoint's public key, which is used in a similar fashion with the exception of the required request signing by the Witness.

PEEiRS Witness Signing: As noted above, new PEEiRS endpoint-to-server sessions cannot be initiated unless the logon request is signed by the Witness. As such, even in the event the endpoint's private or secret key is compromised, it would be impossible to utilize it without also acquiring the private key of the Witness.

Periodic Device Re-Verification: When idle, the PEEiRS endpoint agent periodically performs a re-evaluation of endpoint risk, as well as generates a device fingerprint, all of which is forwarded to the Authentication Server upon completion of the cycle. In the event all of the required credentials and keys are acquired by a malicious actor, a login request would still need to include a matching device fingerprint with acceptable risk profile in order to be considered valid.

Protected Sites Validation: While it may be overly burdensome to ensure all connections presented to an endpoint are legitimate, PEEiRs can be configured to track and validate connections made to/from a defined list of "protected" servers. In the event a non-legitimate TLS certificate is presented, or the resultant DNS response for a known host fails to match stored records, the TCP session can be reset and/or authentication session denied, if applicable. Additionally, a generic and periodic test for suspicious connections can be performed by probing for other known DNS responses or TLS certificates, resulting in a user-alert dialog if so requested.

The above, when coupled with Anti-CSRF tokens and same-site cookies by website or application vendors, should significantly reduce the risk of credential interception, as well as XSS and CSRF based attacks.

Timing Attacks and Authentication Hijacking

Overview: In the event a malicious actor were able to devise an attack that exploits the time between when a PEEiRS agent authentication detection beacon is sent, and the triggering application makes the primary authentication request, it may be possible to "time" a rogue authentication such that PEEiRS inadvertently provides second factor approval of the rogue attempt.

Separately, an attacker may also be able to enumerate valid credential pairs by comparing application or IdP response time from a failed primary (non-PEEiRS activated) login attempt, to that of a successful primary, but failed secondary (PEEiRS) authentication.

Tools and Tactics: Various types of MiTM attacks could be utilized, as the malicious logon attempt would need to originate from the same source IP as the legitimate request.

Detection: Detection methods (and mitigations) previously described in "Interception or Malicious Acquisition of Credentials" would be applicable.

Mitigation(s): While difficult to execute, attacks of this type can be further mitigated through various mechanisms, including:

Validating the primary authentication request originated from the same external IP address as the PEEiRS agent.

Verifying the primary authentication request by comparing TCP/IP, or UDP packet metadata found in the packet header or payload to that observed by the agent.

Inspecting the application's client-to-server communications for signs of manipulation, including but not limited to retransmissions, out of order sequencing, or session state changes.

Risk of valid credential enumeration would need to be mitigated by the IdP, perhaps by applying a random delay to failed primary login attempts.

Compromised Agent or Endpoint

Overview: The possibility exists that the endpoint or agent could become compromised, and in turn be manipulated to provide inadequate or incorrect risk reports to the PEEiRS authentication server. In doing so, PEEiRS may improperly evaluate the compromised endpoint's risk rating, and incorrectly allow access to protected resources.

Tools and Tactics: Endpoint compromise required, which could be achieved through a variety of vectors including malware infection, vulnerability exploitation, or inappropriate use of escalated privileges.

Detection: Possible endpoint compromise could be detected through integration of File Integrity Monitoring, anomalous or malicious process detection, and running process hash validation.

Mitigation(s): A variety of mitigations can be leveraged to reduce this risk, including but not limited to:

Utilization and validation of PEEiRS binary component and other key executable hashes.

Requirement for sustained maintenance of required operating system and program patches, without which PEEiRS device registrations become invalidated.

Privileged use detection, which triggers a complete PEEiRS rescan and revalidation.

Finally, we will be investigating use of Trusted Platform Modules (TPMs) and associated Platform Configuration Registers (PCRs), as well as Physically Unclonable Functions (PUFs), for securing PEEiRS private keys through evaluation of the device state.

Theft of Device

Overview: Despite the various logical protections employed by PEEiRS to protect access to computing resources, various physical threats still exist. As PEEiRS leverages a validated user-endpoint pair as a surrogate authentication factor, potential for significant risk exists from theft of a validated device.

Tools and Tactics: Physical device theft, cloning of a device, and other attacks during periods of low-touch or transient custody (e.g., evil maid attacks).

Detection: Attempted use of a stolen device would be identified or mitigated at time of login via the below noted mitigations.

Mitigation(s): Of course, in the event a locked device is stolen, at least the user's password would still be required to gain access, however we may not be able to detect the presence of weak, written down, or otherwise defeated passwords. As such, in addition to enforcing certain endpoint security requirements (e.g., full disk encryption), PEEiRS incorporates the following mitigation approaches for device theft:

Session token purge: Any time the endpoint is suspended, hibernated, rebooted, powered down, or otherwise times-out; its PEEiRS session token becomes invalidated and a new PEEiRS endpoint logon request, signed by the off-device "Witness" is required. Thus the bad actor would need the endpoint, user credentials, and a somewhat recently unlocked Witness device in order for PEEiRS to grant a new session token and authorize future authentication events (assuming all other risk factors were equal).

User-to-Endpoint Proximity Watchdog (to Witness): As mentioned previously, one of the off-device Witness functions includes the monitoring of Witness-to-Endpoint proximity. In the event an endpoint is stolen and not locked, suspended, or otherwise powered-down; PEEiRS can be configured to purge the current session token after a defined period of excessive distance has been exceeded.

c. Platform Architecture

There are a number of key differences in the PEEiRS approach as compared to proxy or VPN based alternatives, some of which are highlighted in the Table C-1 below as well as FIG. 13, and further depicted in FIG. 6. The first, is the decentralized design of the platform. This design choice allows for any of the PEEiRS components to be situated as close to, or as far from IdPs, application servers, or even endpoints. nrovided latency is properly accounted for to avoid authentication time-outs. Additionally, application performance is preserved as only PEEiRS communications and back-end authentication traffic must traverse the Authentication Proxy Server. That said, while performance and user experience may be preserved in this example, the lack of VPN or proxy may increase risk of attack or resource compromise if systems are not further insulated from direct Internet access.

TABLE C-1

Comparison of key PEEiRS and BeyondCorp differentiators

| | BeyondCorp | PEEiRS | Comments |
|---|---|---|---|
| General Architecture | Centralized | Decentralized | Centralized: Protects/separates resources from direct access via internet |
| Enforcement Point | Situated in front of the requested resource | Situated anywhere Enforced by IdP, with backed integration to PEEiRS | Decentralized: No impact on performance and supports third parties, but exposes servers to Internet |
| Enforcement occurs in traffic path | Access Proxy (AP) | No | |
| Performs authentication and authorization functions | Yes Yes Access Proxy (AP) offloads all auth functions for protected applications | Secondary authentication only Authorization provided by IdP | Each approach has benefits to security, performance, and user experience (see above/below) |
| Performs risk-based evaluation of the endpoint | Yes | Yes | Inline enforcement via AP allows for dynamic application and reevaluation of access rights, as well as centralizes logging. |
| High confidence, user transparent multi-factor authentication | No - AP may challenge user for MFA | Yes - High confidence provided by Witness | However, support of 3$^{rd}$ party or non-HTTP applications may be problematic. |
| Multi-protocol support | Preferred: HTTPS Non-HTTPS applications must be tunneled to AP | Largely protocol agnostic Yes | PEEiRS side-channel enforcement via IdP ensures no performance impact on application traffic, but can make revocation of access difficult |
| Endpoint detection of attacks for in-scope applications | No | | PEEiRS leverages its authority as a secondary authentication factor to enforce a risk-based determination for access AP can revoke access anytime due to position in traffic path Depending on integration, PEEiRS may not be able to revoke access should endpoint risk profile change Although the AP can increase confidence through endpoint |

TABLE C-1-continued

Comparison of key PEEiRS and BeyondCorp differentiators

| BeyondCorp | PEEiRS | Comments |
|---|---|---|
| | | evaluation, no passive means of verifying user identity exists at present PEEiRS is largely application and IdP agnostic, but can leverage a proxy-approach for applications/protocols that it is unable to parse and/or integrate with on the backend if necessary BC centralized design and use of HTTPS does reduce risk of some attacks |

The second is the passive risk-based evaluation of the endpoint, which when coupled with the Off-Device Witness, acts as a high-confidence surrogate multi-factor assertion for the user-endpoint identity pair, without challenging the user at any point post initial registration.

A third differentiator is the use of passive traffic monitoring and out-of-band signaling to detect and provide a high confidence assertion for in-progress application authentication attempts. As we wanted to avoid utilizing a web browser or client-side proxy to act as intermediary in identifying the endpoint as a trusted device, and as depicted in FIG. 6, our approach allows for PEEiRS to remain largely application agnostic, providing support for a multitude of application architectures, including web-based applications (green), proxy-auth federated mail systems (blue), and non-HTTP or federated applications (purple).

i. PEEiRS Components

Endpoint Agent: Perhaps the most integral component of PEEiRS is the endpoint agent, which runs in the background, and performs a variety of functions noted below and depicted in the endpoint agent component diagram shown in FIG. 6.
1. Establishing a "Witness" validated user-device trust relationship with the PEEiRS Authentication Proxy Server.
2. Performing periodic risk evaluations of the endpoint, and sending reports to the Authentication Proxy Server at regular intervals, as well as at time of detected application authentication attempt.
3. Monitoring endpoint activity and traffic for authentication attempts, validating the remote application server as legitimate, and notifying the Authentication Proxy Server at time of detection.

Off-Device (Mobile) Identity Witness: In attempting to counter various threats during the design of PEEiRS, as well as increase the confidence of the active user identity on the endpoint, we created the concept of an off-device identity "Witness". This component provides a series of critical functions which collectively mitigate certain threats while simultaneously increasing the probability of a user being present at the endpoint. These functions include:
1. At time of endpoint registration, the Witness:
   i. Generates a new signing key, which is stored within the mobile device's secure cryptographic storage (e.g., Apple Secure Enclave), and never leaves the device for signing operations.
   ii. Facilitates an easy and rapid second factor for pairing the user and endpoint together, via use of either a pairing code or scan-able QR code on the endpoint.
2. Signing of new endpoint-to-authentication proxy server session request: During normal operation, PEEiRS endpoint agents stay in near-constant communication with the authentication server. In the event a new authenticated session is needed between endpoint and authentication proxy server, the agent's encrypted request is sent to the Witness for signing with it's secured private key. Note, the private key never leaves the Witness device.
3. Serves as a user-to-endpoint proximity watchdog: In the event the distance between Witness and endpoint exceed a predefined threshold for a prolonged period of time, the current endpoint-to-authentication proxy server session is invalidated. Once the Witness returns to close proximity of the endpoint, and provided the Witness device had been somewhat recently unlocked, a new session is automatically created.
   i. Distance calculations can be derived through a variety of approaches, including the evaluation of Bluetooth associated Received Signal Strength Indication or RSSI. When the two devices are in close proximity to each other, a significant sustained decrease in RSSI would indicate the distance between is increasing. As noted by the Bluetooth Special Interest Group (SIG) \\N, absolute RSSI value can vary greatly between chipset manufacturers. Accordingly, this value would need to be baselined at time of endpoint-to-witness pairing, as so a reliable trend can be derived for future use.
   ii. While a variety of attacks are possible that could impact use of the witness in this regard (e.g., spoofing of device identifier, replay attacks, or amplification of the RF), some mitigations can be employed such as encryption of the endpoint-to-witness beacon or comparison of far-end advertised transmit power (TxPower) to actual received power.

Authentication Proxy Server and Asset Manager: From a server-side perspective, two components perform the bulk of the required functions including:
1. Registering and tracking authorized endpoints, their associated hardware and software characteristics, and current risk profile as reported by the endpoint agent.
2. Facilitating generation and cataloging of new keys at time of registration.
3. Evaluating the periodic endpoint status and risk reports, and determining if any information should result in a change in risk rating, which can affect authentication decisions.
4. Integrating with IdPs and other authentication platforms to provide a pseudo-2FA authentication ruling via standards-based protocols (e.g., RADIUS).

5. When needed for integration with proprietary or non-standards based applications, can function as an intermediary gateway or forward/reverse-proxy, positioned either in front of protected applications or (preferably) between applications and authentication platforms.
6. Maintaining the configuration profile for each deployed agent, which includes a list of PEEiRS enabled applications and their associated FQDNs, IP Addresses (optional), and public key fingerprints (for later validation). The profile may also include a list of "protected" but not authentication enabled applications, utilized to identify spoofing or MiTM attacks affecting otherwise legitimate websites.

d. PEEiRS Protocol Sequence Examples

The following section demonstrates a subset of possible implementations of PEEiRS concepts. Each example includes a narrative and associated protocol sequence diagram in Unified Modeling Language (UML), the latter of which are included as Figures.

Figure 9:
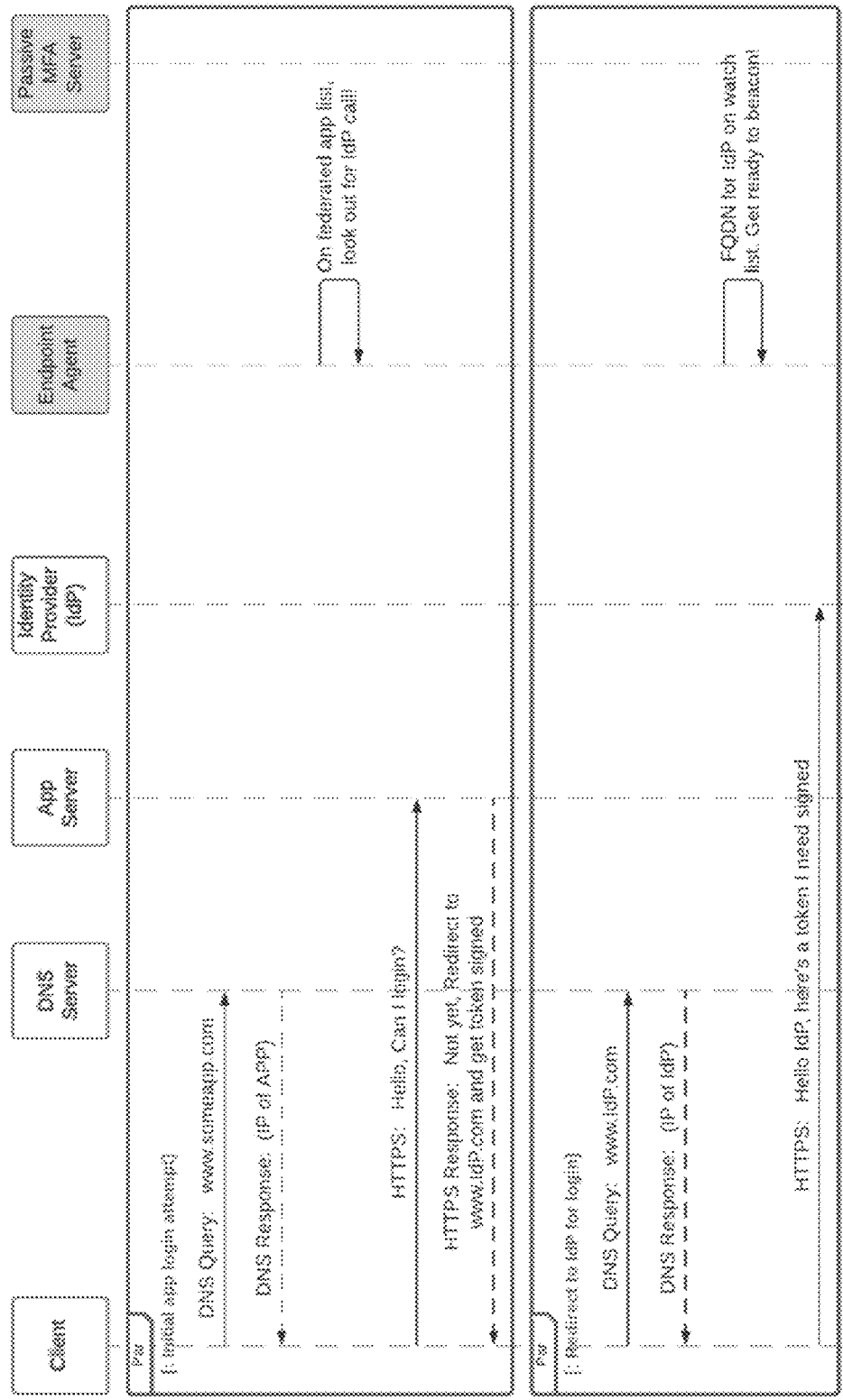
FIG. 9 a and b are sequential segments illustrating s a PEEiRS Applied to SAML/SSO Authentication.

Example A: PEEiRS Applied to SAME SSO
Authentication-Basic Operation (FIG. 9)

In this example, we demonstrate a PEEiRS enriched login sequence for a SAML single-sign-on enabled web application. Note, for simplicity, malicious attack detection is not depicted in this sequence. At a high level the following events take place to facilitate a high confidence authentication with PEEiRS:
1. The endpoint will first contact a DNS server to resolve the IP address of the desired application. PEEiRS agent will take note, but not take action at this time.
2. Endpoint will attempt a single-factor application login, and be redirected via SAML to the associated Identity Provider (IdP) for signing of an authentication token.
3. Endpoint now resolves the IP address for the IdP and connects via HTTPS to attempt a login.
   a. PEEiRS agent detects the authentication attempt via DNS and HTTPS, and sends a login beacon to the authentication proxy server via a separate channel.
   b. PEEiRS server evaluates the beacon and other endpoint information it has recently received, and prepares to make a ruling on a pending secondary authentication request from the IdP (via RADIUS).
4. IdP makes a secondary authentication request to PEEiRS server via RADIUS, which PEEiRS authorizes based upon its risk evaluation of the endpoint, and informs the endpoint agent accordingly.
5. IdP now signs the SAML token, and returns it to the endpoint.
6. Endpoint presents the application with the signed token, and is granted access.

Figure 10:
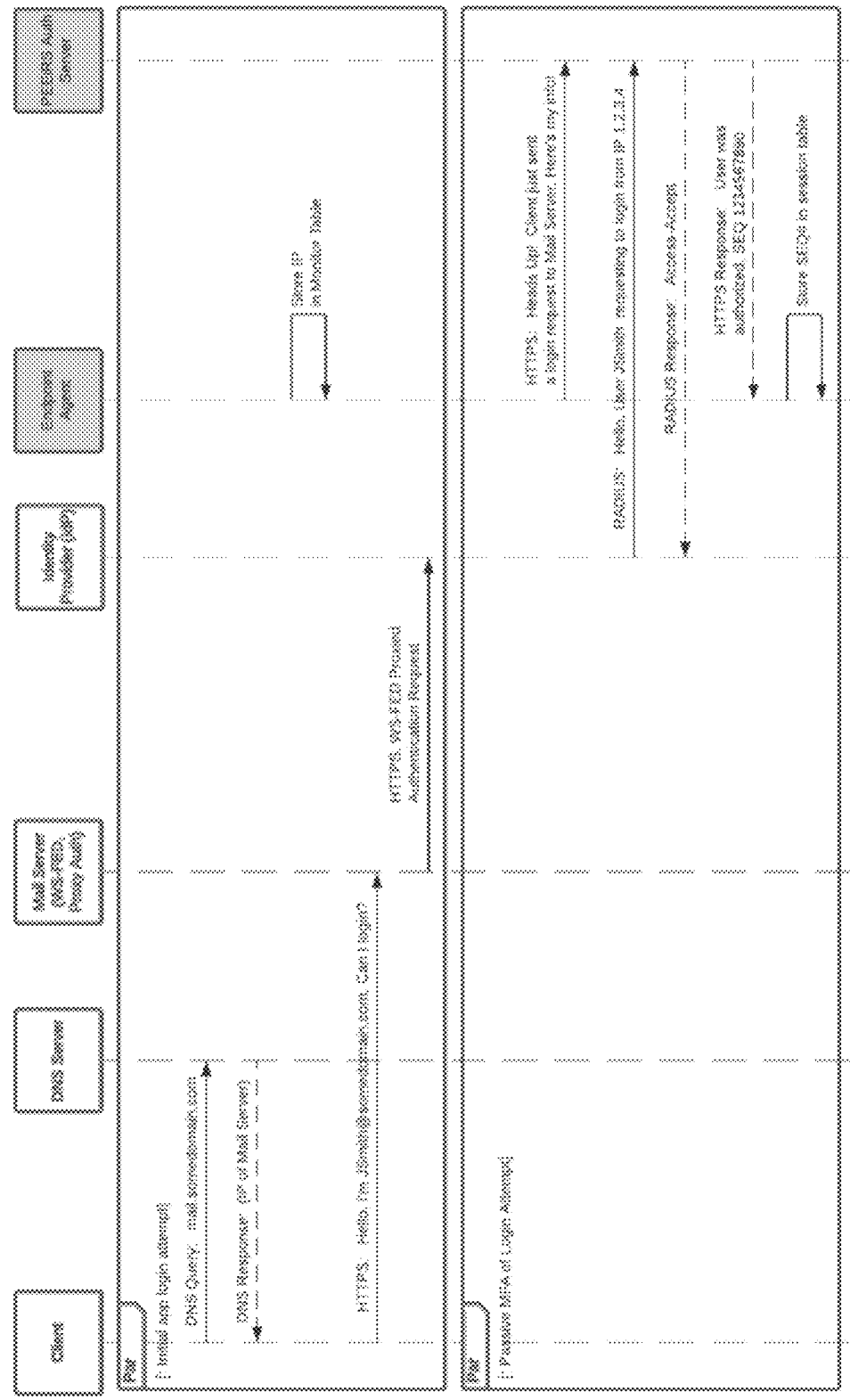
FIG. 10 a and b are sequential segments illustrating PEEiRS Applied to WS/FED Authentication (Proxy-Auth)
Figure 10:
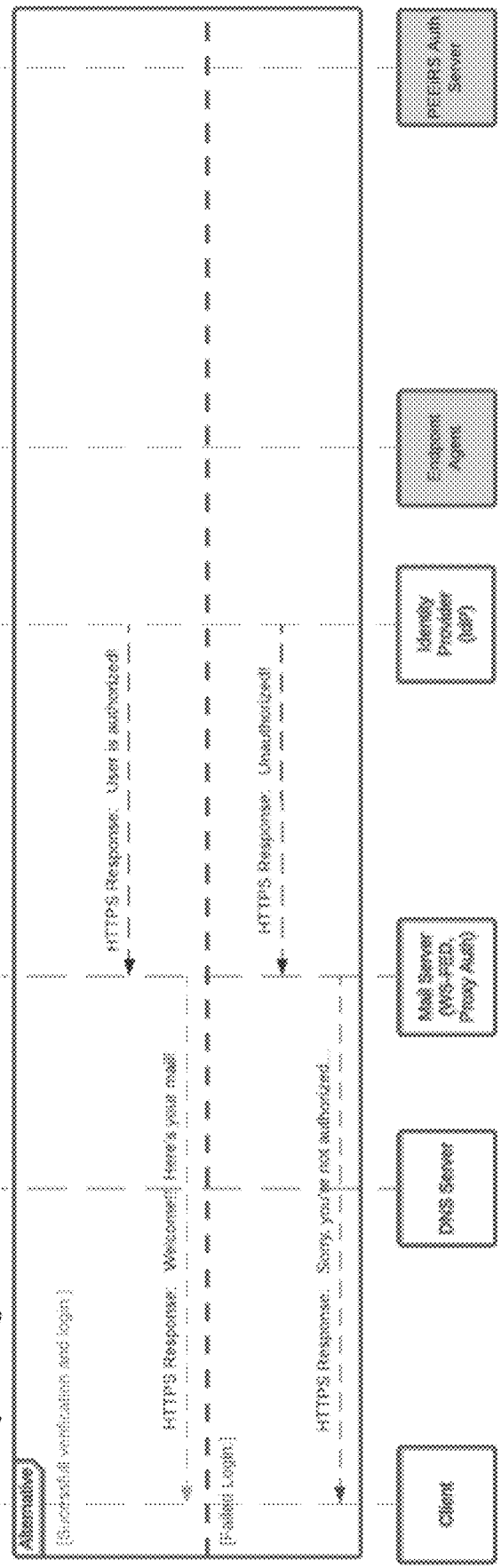

Example B: PEEiRS Applied to WS-FED
Authentication (Pross-Auth)—Basic Operation
(FIG. 10)

In this example, we demonstrate a PEEiRS enriched login sequence for a WS-FED single-sign-on enabled hosted email provider (e.g., Office 365). Note, for simplicity, malicious attack detection is not depicted in this sequence. At a high level the following events take place to facilitate a high confidence authentication with PEEiRS:
1. The endpoint will first contact a DNS server to resolve the IP address of the mail server. PEEiRS agent will take note, but not take action at this time.
2. Endpoint will attempt a single factor login to the hosted mail provider, which will proxy the authentication request directly to the IdP via a back-end WS-FED connection.
   a. PEEiRS agent detects the authentication attempt via DNS and HTTPS, and sends a login beacon to the authentication proxy server via a separate channel.
   b. PEEiRS server evaluates the beacon and other endpoint information it has recently received, and prepares to make a ruling on a pending secondary authentication request from the IdP (via RADIUS).
3. IdP makes a secondary authentication request to PEEiRS server via RADIUS, which PEEiRS authorizes based upon its risk evaluation of the endpoint, and informs the endpoint agent accordingly.
4. IdP responds to the mail provider to authenticate and authorize the user.
5. Mail server passes endpoint a session token to be utilized to access the mail account for the next n hours.

Figure 11:
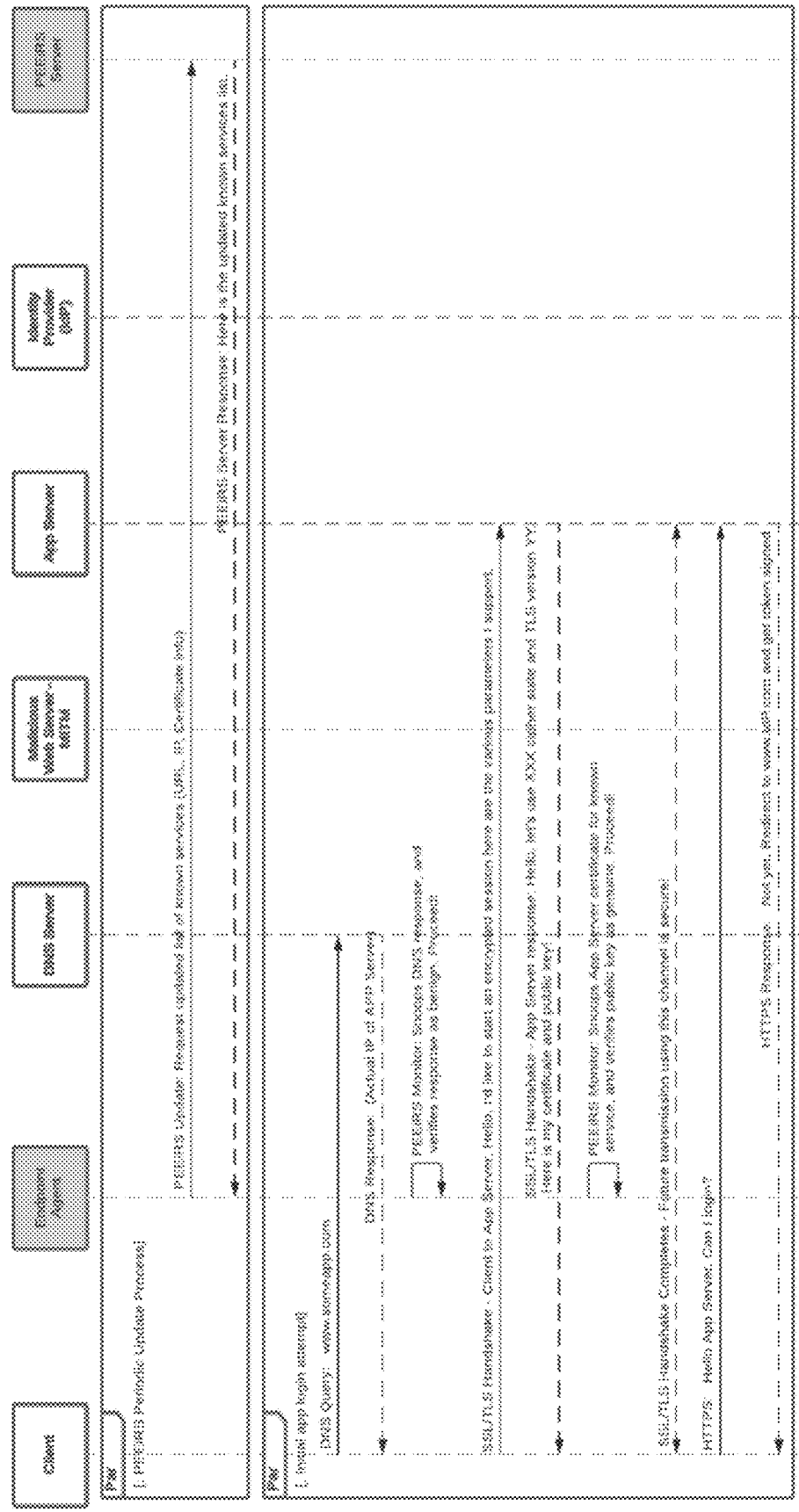
FIG. 11 a, b, and c are sequential segments illustrating PEEiRS applied to SAML-based SSO Authentication with Attack Detection.
Figure 11:
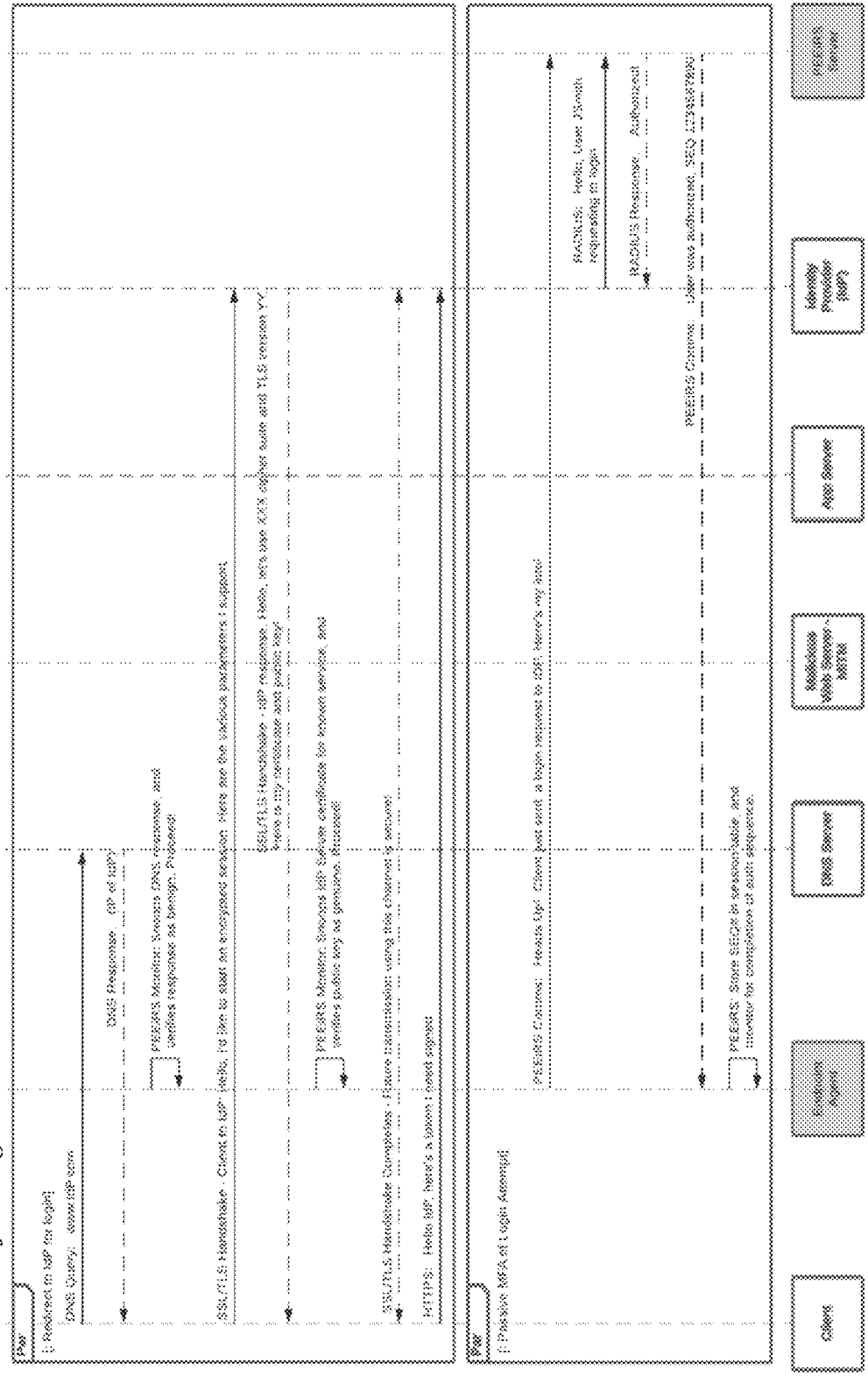
Figure 11:
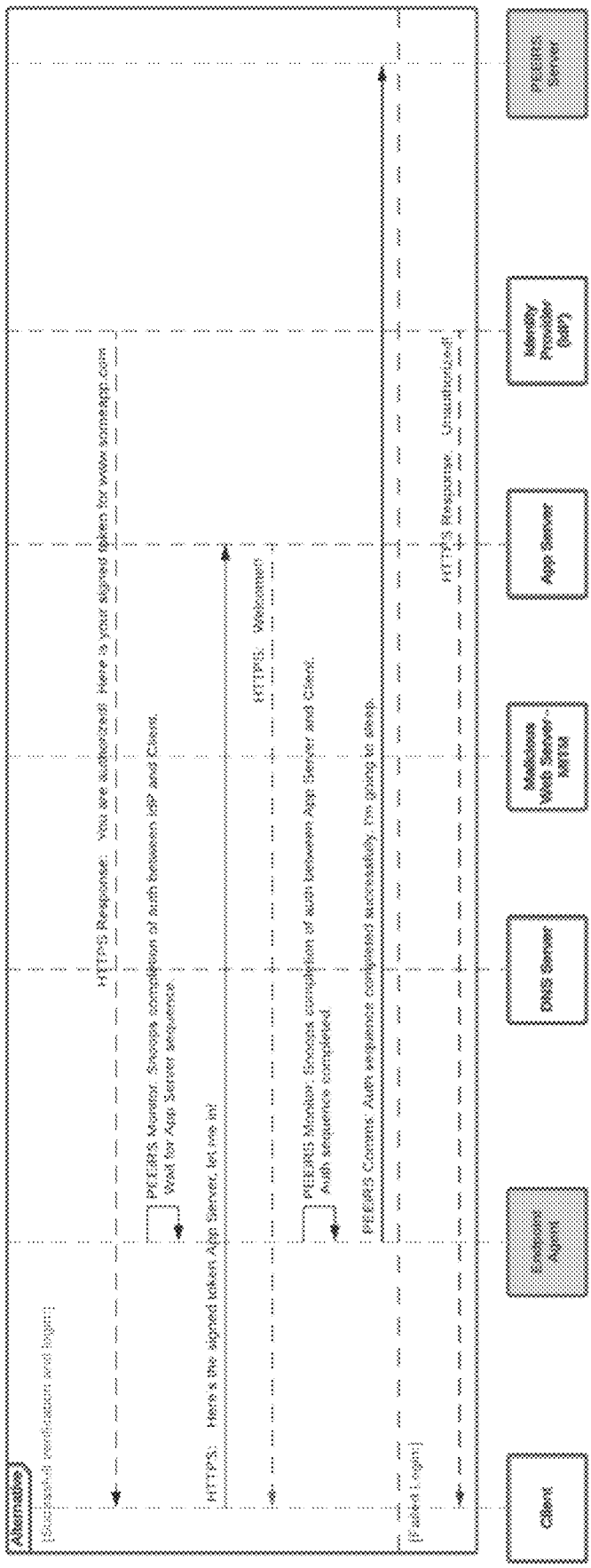

Example C': PEEiRS Applied to SAME/SSO
Authentication-Sneopma Enabled (FIG. 11)

In this example, we demonstrate a PEEiRS enriched login sequence for a SAML single-sign-on enabled web application, with attack detection enabled. At a high level the following events take place to facilitate a high confidence authentication with PEEiRS:
1. PEEiRS agent performs a routine check-in and synchronization with the authentication proxy server. An updated lists of "protected applications" and associated IP addresses and public key fingerprints are also received.
2. Once the user attempts to login to the SSO-enabled application, the endpoint will contact a DNS server to resolve the IP address of the desired application.
   a. PEEiRS agent will detect the DNS query for a protected application, and validate the DNS response as legitimate.
3. Endpoint will initiate an HTTPS connection to the application server's IP address, and attempt to provide a single-factor login, before being redirected to the IdP.
   a. PEEiRS agent will detect the HTTPS call, capture the server's certificate, and verify the provided public key as legitimate.
4. Endpoint now resolves the IP address for the IdP, and connects via HTTPS to attempt a login.
   a. PEEiRS agent detects the authentication attempt via DNS and HTTPS, and performs verification of both events to ensure server legitimacy.
   b. Agent then sends a login beacon to the authentication proxy server via a separate channel.
   c. PEEiRS server evaluates the beacon and other endpoint information it has recently received, and prepares to make a ruling on a pending secondary authentication request from the IdP (via RADIUS).
5. IdP makes a secondary authentication request to PEEiRS server via RADIUS, which PEEiRS authorizes based upon its risk evaluation of the endpoint, and informs the endpoint agent accordingly.
6. IdP now signs the SAML token, and returns it to the endpoint.
7. Endpoint presents the application with the signed token, and is granted access. a. PEEiRS agent monitors traffic flow to verify the authentication sequence completes as expected.

Figure 12:
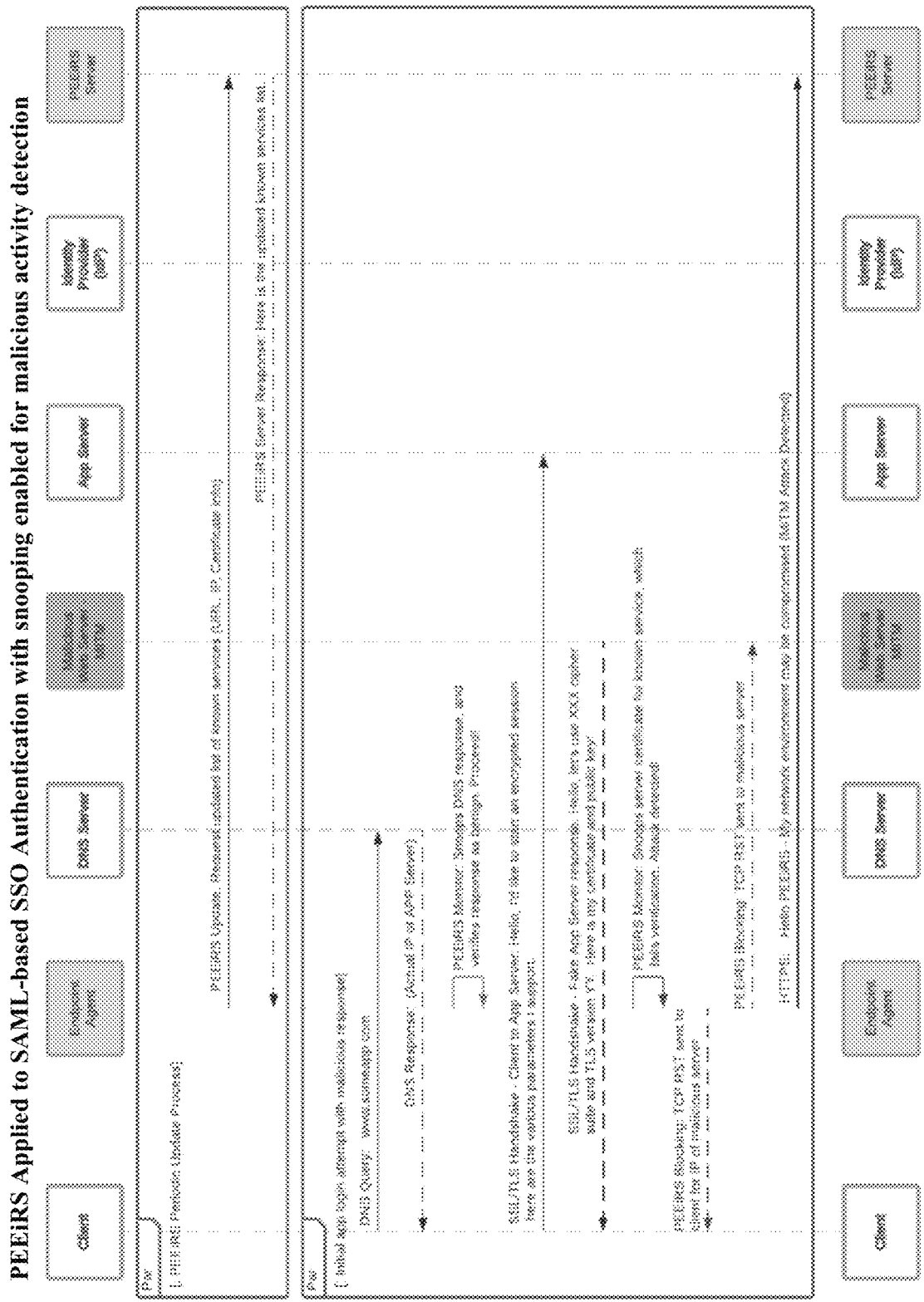
FIG. 12 illustrates PEEiRS Applied to SAML-based SSO Authentication with snooping enabled for malicious activity detection.

Example D: PEEiRS Applied to SAME/SSO
Authentication-Snooping Enabled with Malicious
Detection (FIG. 12)

The last sequence is very similar to Example C, with the exception of a malicious activity detection during the login attempt.
 1. PEEiRS agent performs a routine check-in and synchronization with the authentication proxy server. An updated list of "protected applications" and associated IP addresses and public key fingerprints are also received.
 2. Once the user attempts to login to the SSO-enabled application, the endpoint will contact a DNS server to resolve the IP address of the desired application.
   a. PEEiRS agent will detect the DNS query for a protected application, and validate the DNS response as legitimate.
 3. Endpoint will initiate an HTTPS connection to the application server's IP address, and attempt to provide a single-factor login.
   a. PEEiRS agent will detect the HTTPS call, capture the server's certificate, and attempt to verify the provided public key as legitimate.
   d. PEEiRS agent detects a potential MiTM attack utilizing a fake certificate, and immediately issues TCP-RST to both client and server, effectively shutting down the connection.
   e. Agent then sends an attack notification beacon to the authentication proxy server.
e. Third Party Validation of the Concept From the outset of this project and through composition of this paper, we have consulted with a number of parties to understand if a) PEEiRS fulfils a current requirement or desired capability within their organization; b) What similar solutions have been evaluated, and how they compare; c) What concerns might exist with the PEEiRS approach; and d) How PEEiRS can be improved or changed. Below, and as a sample of the feedback received, we present a summary of comments from three semi-anonymized senior information technology professionals following their review of PEEiRS, each selected from a different vertical market to provide varying perspectives.
a. Reviewer 1: CIO of a Multinational Research Foundation
  Summary: PEEiRS appears to be a very viable and provable concept, which solves a fundamental need for practically every enterprise. Few solutions address the general inherent risk of users without impacting the overall experience, which seems to be the sweet spot for PEEiRS. Reviewer would favor a proof-of-concept deployment in test and production environments, with a full production deployment if possible.
  Fulfils a current requirement or desired capability:
    Yes-requirement for multi-factor authentication, and desired capability for doing it in a user transparent fashion. PEEiRS provides an application agnostic solution which combats theft of credentials, risk associated with mobile endpoints operating in untrusted environments, and brings us much closer to true non-repudiation.
  Other solutions considered:
    Evaluated offerings from Microsoft, Ping, Duo, Okta, and NoPassword. Most can provide MFA with web-based applications, some with a limited risk evaluation of the endpoint, but none that are nearly as application agnostic as PEEiRS.
  Concerns with the PEEiRS approach or design:
    (1) Assuming loss or theft of the witness device, how can a user work? Given the sensitivity of data managed in the environment, management seems willing to lose a day of productivity for the user if necessary.
    (2) A mobile client would be helpful, but understood it is considered for phase II development.
    (3) Will PEEiRS survive a commercial acquisition without being "shelved"?
b. Reviewer II: Head of Infrastructure for a Global Pharmaceutical Company
  Summary: For a rapidly growing and global company with a majority of information resources located in cloud environments, PEEiRS could greatly aid in securing access, especially considering the large percentage of users operating remotely from non-company owned (e.g., BYOD) hardware.
  Fulfils a current requirement or desired capability:
    Yes-PEEiRS fulfils a current requirement, which is to secure access to cloud applications from user owned endpoints.
  Other Solutions Considered:
    Similar solutions such as Duo and Okta have been considered or evaluated for this purpose. They do not compare well to PEEiRS as they: a) lack continual risk assessment of the endpoint; b) do not monitor for MiTM or spoofing; and c) lack support for non-web based applications.
  Concerns with the PEEiRS approach or design:
    1. The solution presently does not cover mobile devices.
    2. Although likely a non-issue, have some concern about device enrollment in BYOD environments.
c. Reviewer III: CEO of a IT Managed Services Provider (MSP), Servicing Fortune 500 Clients Globally
  Summary: As an MSP responsible for supporting a wide range of identity providers and associated applications across vast infrastructure and application pools, the PEEiRS approach to non-user disruptive, and identity provider independent multi-factor authentication is of significant interest. Security is of primary concern to our client base, but challenges associated with scaling many existing solutions along with the potential for user disruption typically sidelines or slows the adoption of appropriate controls.
  Fulfils a current requirement or desired capability:
    Yes—this concept could potentially fulfil both a current requirement and desired capability within our organization, and across the vast majority of our client base. Multi-factor authentication, and the application of risk-based access controls will soon be necessary to combat the multitude of threats associated with allowing access from untrusted environments.
  Other solutions considered:
    Other identity and cloud provider-centric solutions have been evaluated for our various clients, some of which have been implemented or deployed. Very few provide the promise of being identity provider and application independent, while allowing for risk-based evaluations. Overall, we are looking for a single platform to perform this function, which can be leveraged in a multi-tenant like fashion against the various providers utilized by our client base.
  Concerns with the PEEiRS approach or design:
    (1) Can it operate in a multi-tenant like fashion, allowing for us to leverage it for the majority of our client base regardless of application or identity provider?

(2) Will our clients approve of its use, as well as the security measures employed to sufficiently protect client information and assets?

(3) Self-enrollment of endpoints and witness devices could be problematic. The process must be intuitive, fast, and easy for users to do on their own.

d. Reflection on Reviewer Feedback

Overall, we found feedback to be overwhelmingly positive, with each of the three reviewers citing a definitive use case for PEEiRS within their organization. There appeared to be a number of common drivers for this outcome, with the more notable including a) identity provider and application agnostic architecture; b) the passive and continuous risk-based approach, which preserves user experience; and c) ability to detect and mitigate potentially hostile operating environments.

Similarly, concerns noted with the PEEiRS approach were also somewhat uniform and surprisingly relatively minor, with the most common concern centered around solving the "missing witness" scenario, whereby the enrolled witness device was lost, stolen, or simply left at home. Clearly related, and the second most common concern was regarding the current lack of PEEiRS protection for smartphones; an obvious and anticipated request for which development is forthcoming.

i. As one might imagine, the largely positive and constructive feedback we have received to date has further energized our development efforts, and perhaps more importantly provided third party validation of the PEEiRS model.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

REFERENCES

[i] R. Ward and B. Beyer. 2014. "Beyondcorp: A New Approach To Enterprise Security".; login: 39 (6): 6-11. https://www.usenix.org/system/files/login/articles/login_dec14_02_ward.pdf.

[ii] L. Cittadini, B. Spear, B. Beyer, and M. Saltonstall. 2016. "Beyondcorp Part III: The Access Proxy".; login: 41 (4): 28-33. https://www.beyondcorp.com/pdf/45728.pdf.

[iii] B. Osborn, J. McWilliams, B. Beyer, and M. Saltonstall. 2016. "BeyondCorp: Design to Deployment at Google".; login; 41 28-34.

[iv] B. Beyer, C. Beske, J. Peck, and M. Saltonstall. 2017. "Migrating to BeyondCorp: Maintaining Productivity While Improving Security".; login; 42(2).

[v] V. Escobedo, B. Beyer, M. Saltonstall, F. Zyzniewski. "BeyondCorp 5: The User Experience"; login; Fall 2017, Vol. 42(3).

[vi] C. Webber, "Passwords Are Dead. Long Live Multifactor Authentication.", Recode, last modified 2016, accessed Sep. 27, 2017, https://www.recode.net/2016/3/16/11586994/passwords-are-dead-long-live-multifactor-authentication.

[vii] Robert McMillan, "The World's First Computer Password? It Was Useless Too", WIRED, last modified 2012, accessed Sep. 27, 2017, https://www.wired.com/2012/01/computer-password/.

[viii] A. Shostak, "Origins Of Time-Sync Passwords|Emergent Chaos", Emergentchaos.Com, last modified 2009, accessed Sep. 27, 2017, http://emergentchaos.com/archives/2009/07/origins-of-time-sync-passwords.html.

[ix] P. Bright, "RSA finally comes clean: SecurID is compromised". ARS Technica, Jun. 6, 2011. http://arstechnica.com/security/2011/06/rsa-fmally-comes-clean-securid-is-compromised/[x] A. Campi, "How Strong Is Strong User Authentication?", Isaca. Org, last modified 2012, accessed Sep. 29, 2017, https://www.isaca.org/Journal/archives/2012/Volume-5/Pages/How-Strong-is-Strong-User-Authentication.aspx.

[xi] Best practices for implementing trusted endpoints. Duo Security, Inc. Retrieved Apr. 13, 2018. https://duo.com/docs/trusted-endpoints

[xii] Conditions in Azure Active Directory conditional access: Client App (requirements). Microsoft Corp. Updated Feb. 23, 2018. https.//docs.microsoft.com/en-us/azure/active-directory/active-directory-conditional-access-conditions #client-apps

[xiii] B. Schneier, NIST is no longer recommending two-factor authentication using SMS. Schneier on Security, Aug. 3, 2016. https://www.schneier.com/blog/archives/2016/08/nist_is_no_long.html

[xiv] RFC6238: TOTP-Time-based one-time password algorithm. IETF, May 2011. https://tools.ietf.org/html/rfc6238

[xv] History of FIDO Alliance. FIDO Alliance, Retrieved Jan. 27, 2018. https://fidoalliance.org/about/history/Xvi

[xvi] FIDO Alliance Specifications. FIDO Alliance, Retrieved Jan. 27, 2018. https://fidoalliance.org/download/xvii

[xvii] Duo Trusted Endpoints, Duo Security, Retrieved Mar. 31, 2018, https://duo.com/product/trusted-devices/device-access-policies/trusted-endpoints

[xviii] Duo Endpoint Remediation, Duo Security, Retrieved Mar. 31, 2018, https://duo.com/product/trusted-devices/endpoint-remediation

[xix] Conditional access with Microsoft Intune, Microsoft, Updated Feb. 22, 2018, https://docs.microsoft.com/en-us/intune/conditional-access-intune-common-ways-use [xx] Conditional access in Azure Active Directory, Microsoft, Updated Feb. 23, 2018, https://docs.microsoft.com/en-us/azure/active-directory/active-directory-conditional-access-azure-portal

[xxi] Ensuring Device Level Security with Device Trust. Okta, Updated Nov. 6, 2017. https://support.okta.com/help/Documentation/Knowledge_Article/Ensuring-Device-Level-Security-with-Device-Trust

[xxii] Azure Active Directory Libraries. Microsoft, Updated Aug. 25, 2017. https://docs.microsoft.com/en-us/azure/active-directory/develop/active-directory-authentication-libraries

[xxiii] RFC6749: The OAuth 2.0 Authorization Framework. IETF, October 2012. https://tools.ietf.org/html/rfc6749

[xxiv] OpenID: Specifications. OpenID Foundation, retrieved Apr. 17, 2018. http://openid.net/developers/specs/WY

[xxv] Web Services Federation Language (WS-Federation) Version 1.2. OASIS, May 22, 2009. http://docs.oasis-open.org/wsfed/federation/vL2/os/ws-federation-1.2-spec-os.html wVi OASIS Security Services—SAML Technical Committee. OASIS, Retrieved: Mar. 31, 2018. https://www.oasis-open.org/committees/tc_home.php?wg_abbrev=security

[xxvii] RFC 2865: Remote Authentication Dial In User Service (RADIUS). IETF, June 2000. https://tools.ietf.org/html/rfc2865

[xxviii] B. Beyer, C. Beske, J. Peck, and M. Saltonstall. 2017. "Migrating to BeyondCorp: Maintaining Productivity While Improving Security: Remediating Difficult Use Cases"; login; 42(2). pp 52-53.

xxix Verizon 2018 Data Breach Investigation Report. Verizon, Apr. 10, 2018.

xxx V. Gao, "Proximity and RSSI". Bluetooth SIG, Sep. 21, 2015. http://blog.bluetooth.com/proximity-and-rssi

The invention claimed is:

1. A method of providing an application, remote computing resource, or identity provider agnostic means of significantly enriching and supporting a primary authentication or authorization of a user identity, or in effect, a passive secondary authentication, for a user's use of such resources, and with no end-user interaction required for such passive secondary authentication to be asserted, comprising the steps of:
   a. using a first preloaded application on a user's endpoint device, a PEEIRS Agent, periodically collecting, independent of end-user interaction or awareness, at least one or more of the following variables including:
      (i) the likelihood of the stated user being at or near the keyboard of the device,
      (ii) the trustworthiness, ownership, and security posture of the device,
      (iii) the trustworthiness of the computing environment and communications infrastructure in which the user's endpoint is operating,
      (iv) the legitimacy and authenticity of the remote server(s) which the device is communicating with, and
      (v) when a user is attempting to logon and authenticate to a remote computing resource;
   b. using the PEEIRS Agent for monitoring for a user's attempt to logon to, or otherwise access a remote computing resource or identity provider, to collect at least one of the above noted variables, and to pass them to a second preloaded application, a PEEIRS Identity Witness, which is previously installed on a mobile device;
   c. the PEEIRS Identity Witness receives information collected by the PEEIRS Agent and independent of active user interaction:
      (i) determines the last time the authenticating user unlocked the mobile device with biometrics such as fingerprint or facial recognition;
      (ii) digitally signs or encrypts some or all data to be communicated between the user's endpoint, and the PEEIRS Authentication server, and
      (iii) measures the proximity between the personal computer and such separate user mobile device to assert when the user is, or is not, near the keyboard of the authenticating endpoint device; and
   d. using a third preloaded application, a PEEIRS Authentication Server for receiving the aforementioned information produced by the PEEIRS Agent and signed or encrypted by the PEEIRS Identity Witness, and which provides a passive secondary authentication or assertion, with or without calculating a corresponding risk rating, for a user and their authenticating endpoint device when it attempts a connection to a remote computing resource, by performing at least one of the following steps:
      (i) evaluating variables representative of the user's endpoint security posture,
      (ii) verifying the digital signature of the user's separate authenticating mobile device,
      (iii) verifying information about the user's device against a pre-populated asset database,
      (iv) verifying the information about the user against a pre-populated user database, and
      (v) responding to the remote computing resource or identity provider's request to authenticate or assert the user's identity if properly verified and the determined level of risk found to be below a predetermined value for any given remote computing resource being accessed.

2. A method of claim 1, wherein the passive secondary authentication for a remote computing resource occurs out of band from the remote resource's primary authentication system.

3. A method of claim 1, wherein the passive secondary authentication operates independently from the remote computing resource.

4. A method of claim 1, wherein the remote computing resource can initiate a secondary authentication request to the PEEIRS Authentication Server with a standards-based authentication protocol.

5. A method of claim 1, wherein the remote computing resource utilizes a third party identity provider, and such identity provider can initiate a secondary authentication request to the PEEIRS Authentication Server.

6. A method of claim 1, wherein the PEEIRS Agent on the user's endpoint utilizes passive traffic monitoring and out-of-band signaling to detect:
   (i) the occurrence of a user application login attempt, and without user awareness, provide information to the PEEIRS Authentication Server, in support of a high confidence assertion for in-progress application authentication attempts; and
   (ii) the occurrence of a high risk operational condition, and without user awareness, provide information to the PEEIRS Authentication Server, in support of rescinding authentication or authorization rights for one or more applications or information resources.

7. A method of claim 1, wherein the PEEIRS Authentication Server performs the following steps:
   a. registers and tracks authorized endpoints, their associated hardware and software characteristics, and current risk profile as reported by the endpoint or device application,
   b. facilitates generation and cataloging of new digital encryption and signing keys at time of endpoint or mobile device registration,
   c. evaluates the periodic device status and risk reports, and determines if any information should result in a change in risk rating, which can affect authentication decisions,
   d. integrates with third party identity providers, and other authentication platforms to provide a pseudo-second factor authentication ruling via standards-based protocols (e.g., RADIUS),
   e. when needed for integration with proprietary or non-standards based applications, can function as an intermediary gateway or forward/reverse-proxy, positioned either in front of protected applications or (preferably) between applications and authentication platforms,
   f. maintains the configuration profile for each deployed endpoint-side application or agent, which includes a list of PEEIRS Authentication Server enabled applications and their associated fully qualified domain names, IP Addresses (optional), and public key fingerprints (for later validation), and
   g. maintains the configuration profile for each deployed endpoint-side application or agent, which may also include a list of protected but not PEEIRS authentication enabled applications, utilized to identify spoofing or man-in-the-middle attacks affecting otherwise legitimate websites.

8. A system for an application, remote computing resource, or identity provider agnostic means of significantly enriching and supporting a primary authentication or authorization of a user identity, or in effect, a passive secondary authentication, for one or more remote computing resources or applications, and with no end-user interaction required for its ongoing operation, comprising:
 a. a user's endpoint device including a first preloaded application, a PEEIRS Agent, configured to collect in the background, and independently of user interaction, at least one of the following variables:
  (i) the likelihood of the stated user being at or near the keyboard of the device,
  (ii) the trustworthiness, ownership, and security posture of the device,
  (iii) the trustworthiness of the computing environment and communications infrastructure in which the device is operating,
  (iv) the legitimacy and authenticity of the remote server which the device is communicating with, and
  (v) when a user is attempting to logon and authenticate to a remote computing resource or identity provider;
 b. a separate user device including a second preloaded application, a PEEIRS Identity Witness, which further assists in identifying the user by at least one of the following steps:
  (i) the user having used biometric data to previously unlock the device in a pre-configured, and relatively short period of time (i.e. 15 mins to 8 hours)
  (ii) digitally signing or encrypting some or all data to be communicated between the user's endpoint, and the PEEIRS Authentication server, and
  (iii) measuring and using the proximity between the personal computer and such separate user device to assert when the user is, or is not, near the keyboard of the authenticating device; and
 d. a PEEIRS Authentication Server including a third application, which provides, without the authenticating user's awareness, a high confidence assertion of the user's identity, or in effect, a passive second factor of authentication, for a user's attempt of any given connection to a remote computing resource or identity provider, by performing at least one of the following steps with information received from the PEEIRS agent:
  (i) evaluating variables representative of the authenticating user's device security posture,
  (ii) verifying the digital signature of the user's separate authenticating device,
  (iii) verifying information provided by the authenticating user's endpoint device against a pre-populated asset database,
  (iv) verifying the information collected about the authenticating user against a pre-populated user information database,
  (v) responding to the remote computing resource or identity provider's request to authenticate the user if properly verified and the determined level of risk found to be below a predetermined value, and
  (vi) continuously re-verifying the above information for changes that would negatively change the risk assessment of the given user accessing the requested resource, and if necessary, rescinding the authentication or authorization.

9. A system of claim 8, wherein the secondary authentication for a remote computing resource occurs out of band from the remote resource's primary authentication system.

10. A system of claim 8, wherein the secondary authentication operates independently from the remote computing resource.

11. A system of claim 8, wherein the remote computing resource can initiate a secondary authentication request to the PEEIRS Authentication Server with a standards-based authentication protocol.

12. A system of claim 8, wherein the remote computing resource utilizes a third party identity provider, and such identity provider can initiate a secondary authentication request to the PEEIRS Authentication Server.

13. A system of claim 8, wherein the PEEIRS Agent on the user's endpoint utilizes passive traffic monitoring and out-of-band signaling to detect:
 (i) the occurrence of a user application login attempt, and without user awareness, provide information to the PEEIRS Authentication Server, in support of a high confidence assertion for in-progress application authentication attempts; and
 (ii) the occurrence of a high risk operational condition, and without user awareness, provide information to the PEEIRS Authentication Server, in support of a rescinding of authentication or authorization rights for one or more applications or information resources.

14. A system of claim 8, wherein the PEEIRS Authentication Server performs the following steps:
 a. registers and tracks authorized endpoints, their associated hardware and software characteristics, and current risk profile as reported by the endpoint or device application,
 b. facilitates generation and cataloging of new digital encryption and signing keys at time of endpoint or mobile device registration,
 c. evaluates the periodic device status and risk reports, and determines if any information should result in a change in risk rating, which can affect authentication decisions,
 d. integrates with third party identity providers, and other authentication platforms to provide a pseudo-second factor authentication ruling via standards-based protocols (e.g., RADIUS),
 e. when needed for integration with proprietary or non-standards based applications, can function as an intermediary gateway or forward/reverse-proxy, positioned either in front of protected applications or (preferably) between applications and authentication platforms,
 f. maintains the configuration profile for each deployed endpoint-side application or agent, which includes a list of PEEIRS Authentication Server enabled applications and their associated fully qualified domain names, IP Addresses (optional), and public key fingerprints (for later validation), and
 g. maintains the configuration profile for each deployed endpoint-side application or agent, which may also include a list of protected but not PEEIRS Authentication Server enabled applications, utilized to identify spoofing or man-in-the-middle attacks affecting otherwise legitimate websites.

15. A method of providing an application, remote computing resource, or identity provider agnostic means of significantly enriching and supporting a primary authentication or authorization of a user identity, or in effect, a passive secondary authentication, for a user's use of such resources, and with no end-user interaction required for such passive secondary authentication to be asserted, comprising the steps of:

(a) Attempting by a user (endpoint) to log into a single-sign-on (SSO) enabled web application from any given point on the Internet;

(b) Using an application that provides user a SSO token to get signed by pre-established single sign-on or identity provider (IdP), and redirects endpoint web-browser to the IdP;

(c) Conducting simultaneous operations by the endpoint client as well as a PEEiRS agent, being the only time a user may be prompted for single-factor credentials:
  (i) Endpoint connecting to IdP, providing single-factor user credentials and (application provided) SSO token for signing;
  (ii) Simultaneously, the PEEiRS agent detecting the sign-on attempt and notifying an the PEEIRS Authentication Server of the impending authentication request from the IdP, including the latest endpoint risk evaluation report;

(d) IdP performing a primary authentication verification on the single-factor credentials provided by the user/endpoint, and if successful makes a 2FA query via RADIUS or other standards based authentication protocol to the PEEiRS Authentication Server;

(e) PEEiRS Authentication Server evaluating the request from IdP along with the associated PEEiRS agent notification and risk report, and either accepts or denies the IdP's 2FA/RADIUS inquiry;

(f) If accepted, IdP signs (provides an assertion for) the SSO token and returns it to the endpoint; and (g) Endpoint sending the signed SSO token back to the application server, which is accepted and user is granted access to the application.

* * * * *